United States Patent
Strashny

(10) Patent No.: US 11,855,379 B2
(45) Date of Patent: Dec. 26, 2023

(54) SLIDABLE NESTED CONDUCTORS

(71) Applicant: Caterpillar Inc., Peoria, IL (US)

(72) Inventor: Igor Strashny, Tucson, AZ (US)

(73) Assignee: Caterpillar Inc., Peoria, IL (US)

(*) Notice: Subject to any disclaimer, the term of this patent is extended or adjusted under 35 U.S.C. 154(b) by 45 days.

(21) Appl. No.: 17/456,479

(22) Filed: Nov. 24, 2021

(65) Prior Publication Data

US 2023/0163507 A1 May 25, 2023

(51) Int. Cl.
*H01R 33/00* (2006.01)
*H01R 13/26* (2006.01)
*B60L 50/53* (2019.01)

(52) U.S. Cl.
CPC .............. *H01R 13/26* (2013.01); *B60L 50/53* (2019.02); *B60L 2200/40* (2013.01); *H01R 2201/26* (2013.01)

(58) Field of Classification Search
CPC ..... H01R 13/26; H01R 2201/26; B60L 50/53; B60L 2200/40
USPC .......................................................... 439/34
See application file for complete search history.

(56) References Cited

U.S. PATENT DOCUMENTS

| | | | | |
|---|---|---|---|---|
| 3,646,512 A | * | 2/1972 | Borgstede | G01G 19/12 340/440 |
| 4,057,010 A | * | 11/1977 | Smith | B30B 9/3057 100/249 |
| 4,302,066 A | * | 11/1981 | Newman | H01R 13/6395 439/347 |
| 4,746,106 A | * | 5/1988 | Fukumura | F16F 9/468 267/64.22 |
| 5,560,454 A | * | 10/1996 | Jensen | F16F 9/34 188/282.3 |
| 5,639,255 A | * | 6/1997 | Muzslay | H01R 13/6277 439/347 |
| 5,690,195 A | * | 11/1997 | Kruckemeyer | F16F 9/368 188/282.5 |
| 5,823,813 A | * | 10/1998 | Dye | H01R 13/6277 439/358 |
| 6,007,345 A | * | 12/1999 | Francis | F16F 9/463 188/282.2 |

(Continued)

FOREIGN PATENT DOCUMENTS

| | | |
|---|---|---|
| CN | 201516809 U | 6/2010 |
| CN | 101947920 A | 1/2011 |

(Continued)

OTHER PUBLICATIONS

Written Opinion and International Search Report for Int'l. Patent Appln. No. PCT/US2022/050018, dated Apr. 7, 2023 (9 pgs).

*Primary Examiner* — Abdullah A Riyami
*Assistant Examiner* — Vladimir Imas

(57) ABSTRACT

A work machine powered electrically by a conductor rod contacting power rails along a haul route. The conductor rod has a central passageway coupling a head to a tip. A barrel extending from the head and an arm extending from the tip have concentric tubular conductors radially offset from each other and slidably mated together. The concentric tubular connectors maintain physical and electrical contact as the conductor rod extends and contracts so that contact with electrical power is maintained despite lateral movements caused by steering or road conditions.

20 Claims, 12 Drawing Sheets

(56) References Cited

U.S. PATENT DOCUMENTS

| | | | |
|---|---|---|---|
| 6,036,500 A * | 3/2000 | Francis | H01R 13/6273 439/352 |
| 6,345,706 B1 * | 2/2002 | Oliver | F16F 9/463 188/267.2 |
| 6,379,162 B1 * | 4/2002 | Raypole | H01R 33/7664 188/282.2 |
| 6,607,393 B2 * | 8/2003 | Raypole | H01R 33/7664 439/349 |
| 6,637,555 B2 * | 10/2003 | Miller | F16F 9/54 188/266.5 |
| 6,750,399 B1 | 6/2004 | Daumling | |
| 6,758,687 B2 * | 7/2004 | Raypole | H01R 33/7664 439/92 |
| 6,786,311 B2 * | 9/2004 | Lun | F16F 9/535 188/267.2 |
| 6,840,358 B2 * | 1/2005 | Kos | F16J 15/3224 277/352 |
| 7,293,633 B2 * | 11/2007 | Lun | F16F 9/0281 188/267.2 |
| 8,872,026 B2 | 10/2014 | Guyader et al. | |
| 8,925,405 B2 | 1/2015 | Kawabuchi et al. | |
| 8,978,852 B2 | 3/2015 | Andre et al. | |
| 9,396,894 B2 * | 7/2016 | Pora | H01H 19/14 |
| 9,870,845 B2 | 1/2018 | Nagahashi | |
| 10,053,096 B2 | 8/2018 | Schunk et al. | |
| 10,137,785 B2 | 11/2018 | Vahle et al. | |
| 10,151,369 B2 * | 12/2018 | Hwang | F16F 9/32 |
| 10,232,719 B2 | 3/2019 | Tajima | |
| 10,252,639 B2 * | 4/2019 | Tajima | B60M 1/36 |
| 2003/0148661 A1 * | 8/2003 | Raypole | H01R 33/7664 439/587 |
| 2014/0159968 A1 | 6/2014 | Maier et al. | |
| 2014/0345904 A1 | 11/2014 | Nagahashi | |
| 2016/0264000 A1 | 9/2016 | Zimmerman et al. | |
| 2017/0106767 A1 | 4/2017 | Tajima et al. | |
| 2017/0210238 A1 | 7/2017 | Buehs et al. | |
| 2022/0302640 A1 * | 9/2022 | Pasetti | H01R 43/26 |

FOREIGN PATENT DOCUMENTS

| | | |
|---|---|---|
| CN | 204452108 U | 7/2015 |
| CN | 110239351 | 9/2019 |
| CN | 107215238 B | 8/2020 |
| CN | 211543283 U | 9/2020 |
| EP | 2284635 A | 2/2011 |
| JP | 6691672 B2 | 5/2020 |
| KR | 101466354 B1 | 11/2014 |
| WO | WO2009007879 A2 | 1/2009 |
| WO | WO2020186296 A1 | 9/2020 |

* cited by examiner

US 11,855,379 B2

SLIDABLE NESTED CONDUCTORS

TECHNICAL FIELD

The present disclosure relates to a system used to provide electrical power to an electrically powered load or work machine. More specifically, the present disclosure relates to a conductive rod for an electrically powered work machine, whereby the conductive rod is extendable and retractable along a length of the conductive rod to maintain an electrical and/or physical connection with a roadside power source and the work machine using the conductive rod.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

Electrical power has been used to supplement these diesel engines while the work machines move. In some environments, the electrical power is delivered from wires over the haul route to a pantograph on the work machine as the machine travels the haul route, as in a cable car. But overhead wires cannot reliably provide sufficient electrical energy to power a heavy work machine during long movements. Nor can the overhead delivery provide enough current to charge backup batteries for an electric machine at the same time. In addition, connection with overhead wires tolerates only small lateral movements by the vehicle before arcing or disconnection occurs. As a result, electrical power provided through overhead wires typically supplements, rather than replaces, power generated by diesel engines in heavy work machines.

In some environments, such as mine sites or other worksites in which the haul routes or other paths traveled by the work machines tend to be relatively non-linear, such overhead wires may be replaced by a power rail positioned adjacent to haul route. Establishing an electrical connection with a power rail can require precise movements of a conductor from a heavy work machine, however, and maintaining an electrical connection with a power rail while a heavy work machine moves can be particularly challenging. In locations such as a mining site, the haul route may be uneven, hilly, and pocked. These variations may lead to irregular movements by the machine or unexpected changes in position by the power rail, causing the machine to disconnect from the rail. Steering deviations for the heavy work machine could also disrupt the connection of the machine with the power rail, detracting from the value of rail-based delivery of electrical power.

One approach for providing electrical power to a vehicle through a rigid conductor is described in U.S. Patent App. Pub. No. 2017/0106767A1 ("the '767 application"). The '767 application describes a vehicle power supply method in which a charging arm of fixed length is deployed transversely from a vehicle to contact a power supplying apparatus. To reach the power supplying apparatus with the arm, a device is caused to slide along the side of the vehicle, which forces a damper unit to push the arm around an axis of rotation and displace its end outwardly from the vehicle.

A rotating arm of fixed length, as described in the '767 application, however, has a limited reach from the side of the vehicle, which limits the lateral movement available in steering. Moreover, support for the arm is essentially limited to one end of the arm at the axis of rotation, which may be inadequate to support a long arm of substantial weight. Such a mechanism would also be prone to failure when used in harsh conditions such as mine sites, paving sites, and construction sites. As a result, the system described in the '767 application is not desirable for heavy work machines having high electrical power loads or operating in environments in which the machines may substantially deviate along their paths when moving.

Examples of the present disclosure are directed to overcoming deficiencies of such systems.

SUMMARY

In one aspect of the presently disclosed subject matter, a conductor rod includes an arm section extending along a longitudinal axis of the conductor rod section and a barrel section extending the longitudinal axis of the conductor rod. The arm section includes a first piston conductor affixed to a connector assembly at a first end of the conductor rod, the first piston conductor extending along the longitudinal axis having a first inner diameter and a first outer diameter, a second piston conductor affixed to the connector assembly at the first end, the second piston conductor extending along the longitudinal axis having a second inner diameter greater than the first outer diameter and a second outer diameter, and an arm affixed to the connector assembly at the first end, the arm extending along the longitudinal axis having a third inner diameter greater than the second outer diameter and a third outer diameter. The barrel section includes a first cylinder conductor affixed to a head-end interface at a second end of the conductor rod, the first cylinder conductor extending along the longitudinal axis having a fourth outer diameter and a fourth inner, wherein the fourth inner diameter is greater than the first outer diameter of the first piston conductor, wherein a first inner surface of the first cylinder conductor is slidably engaged to a first outer surface of the first piston conductor at a first conducting interface, a second cylinder conductor affixed to the head-end interface at the second end, the second cylinder conductor extending along the longitudinal axis having a fifth outer diameter less than the second inner diameter of the second piston conductor and greater than the fourth outer diameter of the first cylinder conductor, wherein a second outer surface of the second cylinder conductor is slidably engaged to a second inner surface of the second piston conductor at a second conducting interface, and a barrel affixed to the head-end interface at the second end, the barrel extending along the longitudinal axis having a sixth inner diameter greater than the third outer diameter of the arm, wherein a third inner surface of the barrel is slidably engaged to a third outer surface of the second piston conductor.

In another aspect of the presently disclosed subject matter, a work machine includes an electric engine and a conductor rod for providing electrical energy to the electric engine from a power source, the conductor rod extending a longitudinal axis from a first end proximate the work machine to a second end spaced laterally from the work machine. The conductor rod includes an arm section inserted into a barrel section. The arm section includes a first piston conductor affixed to a connector assembly at the second end, the first piston conductor extending along the longitudinal axis having a first inner diameter and a first outer diameter, a second piston conductor affixed to the connector assembly, the second piston conductor extending along the longitudinal axis having a second inner diameter greater than the first outer diameter and a second outer diameter, and an arm affixed to the connector assembly, the arm extending along the longitudinal axis having a third inner diameter greater than the second outer diameter and a third outer diameter. The barrel section includes a first cylinder conductor affixed to a head-end interface at the first end, the first cylinder conductor extending along the longitudinal axis having a fourth outer diameter and a fourth inner, wherein the fourth inner diameter is greater than the first outer diameter of the first piston conductor, wherein a first inner surface of the first cylinder conductor is slidably engaged to a first outer surface of the first piston conductor at a first conducting interface, a second cylinder conductor affixed to the head-end interface at the first end, the second cylinder conductor extending along the longitudinal axis having a fifth outer diameter less than the second inner diameter of the second piston conductor and greater than the fourth outer diameter of the first cylinder conductor, wherein a second outer surface of the second cylinder conductor is slidably engaged to a second inner surface of the second piston conductor at a second conducting interface, and a barrel affixed to the head-end interface, the barrel extending along the longitudinal axis having a sixth inner diameter greater than the third outer diameter of the arm, wherein a third inner surface of the barrel is slidably engaged to a third outer surface of the second piston conductor.

In a still further aspect of the presently disclosed subject matter, a method of assembling a conductor rod includes forming a barrel section by affixing a first cylinder conductor to a head-end interface using a first terminal connector, affixing a second cylinder conductor to the head-end interface using a second terminal connector, affixing a third cylinder conductor to the head-end interface using a third terminal connector, and affixing a barrel to the head-end interface using a fourth terminal connector. The method further includes forming an arm section by affixing a first piston conductor to a conductor assembly using a fifth terminal connector, affixing a second piston conductor to the conductor assembly using a sixth terminal connector, affixing a third piston conductor to the conductor assembly using a seventh terminal connector, affixing an arm to the conductor assembly using an eighth terminal connector, and inserting the arm section into the barrel section, whereby the first piston conductor is inserted into an interior space of the first cylinder conductor, the second piston conductor is inserted into a first cylinder cavity defined by an interior surface of the second cylinder conductor and an exterior surface of the first piston conductor, the third piston conductor is inserted into a second cylinder cavity defined by an interior surface of the third cylinder conductor and an exterior surface of second piston conductor, and the arm is inserted into a third cylinder cavity defined by an interior surface of the barrel and an exterior surface of the third piston conductor.

DETAILED DESCRIPTION

Figure 1:
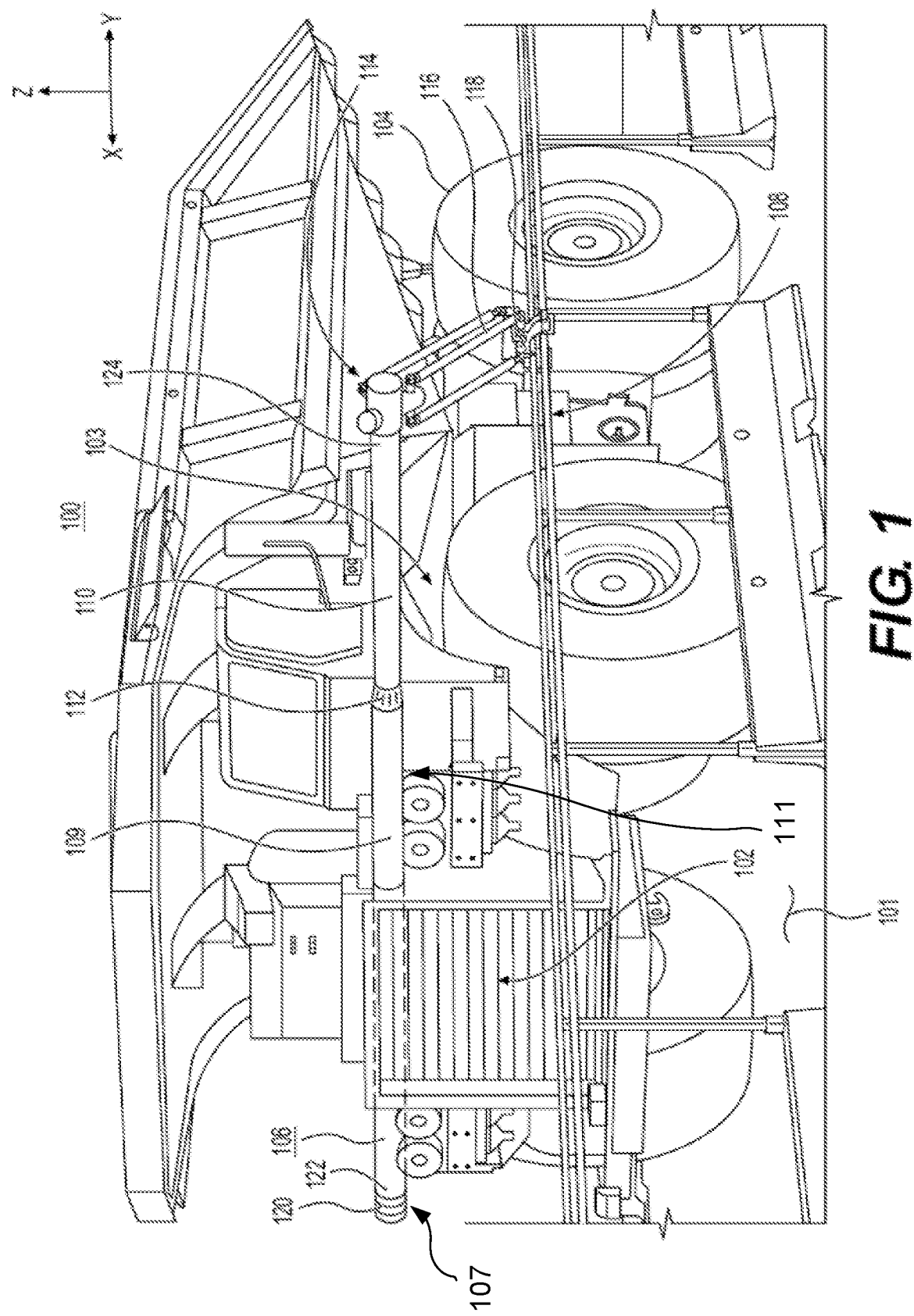
FIG. 1 illustrates an isometric view of a work machine within an XYZ coordinate system as one example suitable for carrying out the principles discussed in the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. The exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, the work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, and relevant to the presently disclosed subject matter, the work machine 100 further includes a conductor rod 106 configured to receive electrical power from a power rail 108. In some examples, power rail 108 is one or more beams of metal arranged substantially parallel to and a distance above the ground. In FIG. 1, power rail 108 is positioned to be substantially parallel to the X axis and the direction of travel of work machine 100. Support mechanisms hold power rail 108 in place along a distance at the side of haul route 101 for work machine 100 to traverse. The support mechanisms and power rail 108 may be modular in construction, enabling their disassembly and reassembly at different locations or their repositioning along the existing haul route 101. In many examples, such as within a mining site, power rail 108 will not be configured continuously at a fixed distance along a side of haul route 101 and at a fixed height above the ground due, at least in part, to the variation of the terrain. Therefore, it is expected that the vertical, horizontal, and angular positions of the surface of power rail 108 in the XYZ planes will vary along haul route 101. Moreover, while shown in FIG. 1 to the left of work machine 100 as work machine 100 travels in the direction of the X axis, power rail 108 may be installed to the right of work machine 100 or in other locations suitable to the particular implementation.

Power rail 108 provides a source of electrical power for work machine 100 as either AC or DC. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides 0 volts relative to the other two conductors. The two powered conductors within power rail 108 provide +1500 VDC and −1500 VDC. These values are exemplary, and other physical and electrical configurations for power rail 108 are available and within the knowledge of those of ordinary skill in the art Further, it should be understood that the voltages described herein are merely exemplary, as various levels of AC voltage may be used, as well as a combination of AC and DC voltages, depending on the particular configuration.

Conductor rod 106 enables electrical connection between work machine 100 and power rail 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a first end 107 near a right side of work machine 100 and a second end 111 at a left side of work machine 100. Conductor rod 106 may be attached to any convenient location within work machine 100, such as to frame 103, in a manner to couple conductor rod 106 to power rail 108. Shown in FIG. 1 as extending to a left side of work machine 100 toward power rail 108, conductor rod 106 may alternatively be arranged to extend to a right side and at any desired angle from work machine 100 such that conductor rod 106 may be coupled to power rail 108 for obtaining electrical power.

As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within barrel 109, an arm 110 is retained. Arm 110 is slidably engaged within conductor rod 106 such that it may be extended or retracted axially, i.e., along the Y axis in FIG. 1, to adjust the reach of conductor rod 106. Specifically, in a retracted position, arm 110 is caused to slide within barrel 109 of conductor rod 106 such that a length of conductor rod 106 roughly spans the width of work machine 100. A junction 112 serves as the junction or interface between arm 110 and barrel 109, which is the main body of conductor rod 106. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101.

Within, and possibly including barrel 109, conductor rod 106 includes a series of electrical conductors passing longitudinally, at least from a head 122 at first end 107 of conductor rod 106 to a tip 124 of the conductor rod 106. Typically, the conductors within conductor rod 106 are formed of a metallic material and are rigid. In some examples, the conductors are concentric tubes, or hollow cylinders, of solid metal such as copper, aluminum, gold, silver, nickel, zinc, or alloys thereof nested together and sized to provide electrical capacity sufficient for powering work machine 100. Tubular conductors within arm 110 slidably engage with corresponding tubular conductors within barrel 109 to maintain electrical continuity as arm 110 is extended or retracted. In other examples, one or more concentric copper tubes, rather than aluminum, of varying diameters may be used as tubular conductors. Other types of conductive tubes may be used and are considered to be within the scope of the presently disclosed subject matter.

At the tip 124, a connector assembly 114 provides an interface to power rail 108 via trailing arms 116 and contactor 118. Power rail 108 is typically arranged along a side of haul route 101, and work machine 100 is steered so that it traverses haul route 101 substantially in parallel with power rail 108. Thus, in reference to FIG. 1, power rail 108 and a travel path for work machine 100 are substantially in parallel with each other and with the X axis. Contactor 118 is configured to maintain an electrical connection with power rail 108 while sliding along its surface in the direction of the X axis as work machine 100 moves. In some examples, trailing arms 116 are conductors coupled to contactor 118, each conducting voltage and current at a different electrical pole and corresponding to the conductors within conductor rod 106. In operation, electrical power is accessed from power rail 108 via contactor 118, which remain in contact during movement of work machine 100, and the electrical power is conducted through trailing arms 116 into connector assembly 114.

From connector assembly 114, the electrical power is conveyed at tip 124 through the nested tubular conductors within arm 110 and barrel 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for inputs to control mechanical operation of conductor rod 106, such as passageways for pressurized air of a pneumatic control system to extend and retract arm 110 or signaling for electronic controls.

As noted above, the tubular or cylindrical nature of conductor rod 106, lending to a degree of rigidity, can provide a mechanism to conduct electrical power from a source to a load over an unsupported distance that may vary in length as the work machine 100 travels along a path. Further, as described above, trailing arms 116 are conductors coupled to contactor 118, each conducting voltage and current at a different electrical pole and corresponding to the conductors within conductor rod 106. Different cylindrical conductors within conductor rod 106 can provide for the transmission of different potentials along conductor rod 106, illustrated in more detail in FIG. 2, below.

Figure 2:
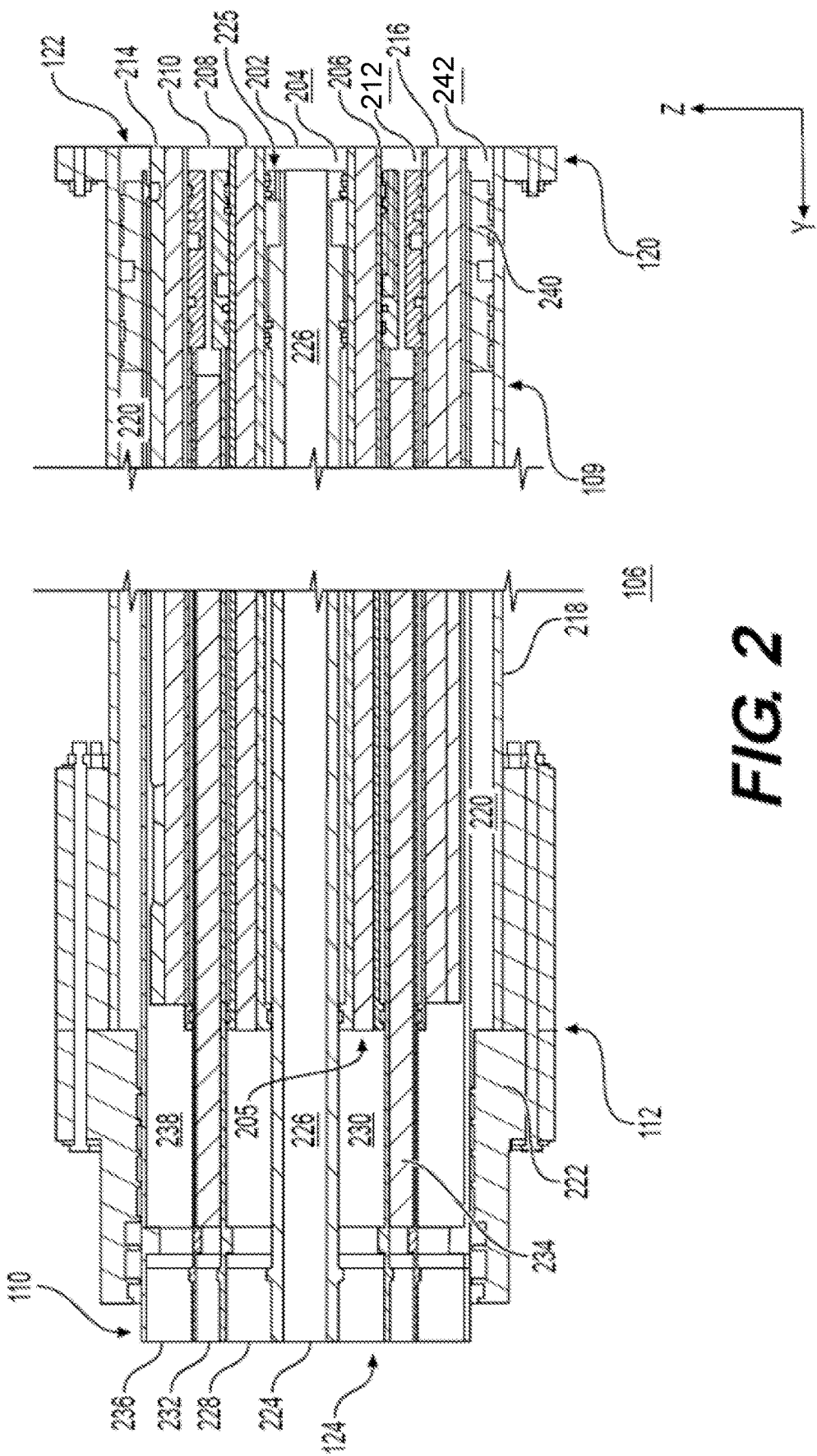
FIG. 2 illustrates a longitudinal cross-section of a conductor rod with an arm disposed in a barrel, in accordance with one or more examples of the present disclosure.

FIG. 2 illustrates a longitudinal cross-section of conductor rod 106 when arm 110 is retracted, or collapsed, into barrel 109, in accordance with one or more examples of the present disclosure. More specifically, FIG. 2 depicts a longitudinal section of conductor rod 106 between head-end interface 120 and connector assembly 114, from head 122 to tip 124, when viewed facing in the direction of travel for work machine 100, i.e., in the direction of the X axis. Thus, conductor rod 106 lies in the Y-Z plane, as indicated in FIG. 2.

Referring to the right side of FIG. 2, barrel 109 contains an arrangement of concentric conductors of tubular shape, i.e., as hollow cylinders. In this example, from the axial center outward, first cylinder conductor 202 is positioned at a center of barrel 109 and is a tubular conductor made of aluminum or a similar metal with high electrical conductivity and high mechanical strength. For instance, an aluminum alloy such as 6061-T6 may be used for first cylinder conductor 202 and other conductive tubes in conductor rod 106. Other suitable metals or alloys thereof may be used and are considered to be within the scope of the presently disclosed subject matter. In some examples, first cylinder conductor 202 has an outer diameter of approximately 3.5 inches to 4.5 inches. However, it should be understood that dimensions provided herein are merely for purposes of illustration and are not intended to be limitations, as dimensions described in relation to various components may be greater or less than the examples provided herein. First cylinder conductor 202 begins at head 122 and extends axially along conductor rod 106 around a longitudinal Y axis to a barrel end 205. Barrel end 205 in this example of FIG. 2 is approximately radial to junction 112. As a tube, first cylinder conductor 202 defines first cylinder cavity 204 within its inner surface. If arm 110 were removed from barrel 109 in FIG. 2, first cylinder cavity 204 would be an open space within first cylinder conductor 202 traveling the length of conductor rod 106 from head 122 to barrel end 205. In one example, first cylinder cavity 204 has a diameter of about 2.5 to 3 inches.

A second cylinder conductor 206 concentrically surrounds first cylinder conductor 202. As with first cylinder conductor 202, second cylinder conductor 206 is a tubular conductor made of aluminum or a similar metal with high electrical conductivity and high mechanical strength. Second cylinder conductor 206 is similarly positioned around a Y axis within FIG. 2 and spans a distance from head 122 to barrel end 205. In one example, second cylinder conductor 206 has an outer diameter of about 5 to 5.5 inches. These dimensions, as well as other dimensions discussed below, are merely examples and could be greater or lesser than the stated values. Being arranged concentrically around and, by definition, having a larger diameter than first cylinder conductor 202, second cylinder conductor 206 forms a radial gap between it and first cylinder conductor 202. In the example of FIG. 2, that gap is filled by second cylinder insulation 208, which is a closed cell polyurethane foam. Other types of materials for second cylinder insulation 208 that provide electrical insulation and lightweight support within conductor rod 106 will be available and apparent to those of ordinary skill in the field. In some examples, second cylinder insulation 208 has a thickness of about 0.75 inches.

In some examples, second cylinder insulation 208 can be a dielectric. Dielectric materials can be solids, liquids, or gases. Some solids can be used as dielectrics, such as porcelain, glass, plastics, and the closed cell polyurethane foam described above. In configurations in which a cylinder conductor or piston conductor is hermetically sealed on both ends of the cylinder conductor or piston conductor, fluidic dielectrics can be used in gaps, such as radial gap first cylinder conductor 202 and second cylinder conductor 206. Fluid dielectrics can include some forms of oil or gaseous dielectrics such as air, nitrogen, helium, and other dry gases such as sulfur hexafluoride. In further configurations in which a cylinder conductor or piston conductor is hermetically sealed on both ends of the cylinder conductor or piston conductor, a partial vacuum can be used. In various examples, a partial vacuum can be used as a nearly lossless dielectric even though its relative dielectric constant is unity. It should be noted that the dielectrics disclosed herein are merely examples, as other dielectrics may be used and are considered to be within the scope of the presently disclosed subject matter. Different dielectrics can be used in various radial gaps of conductor rod 106 to allow for different voltages and different types of potentials to be conducted by conductor rod 106.

Moving farther out radially on the right side of FIG. 2, third cylinder conductor 210 concentrically surrounds second cylinder conductor 206 and first cylinder conductor 202. Third cylinder conductor 210 is a tubular conductor made of aluminum or a similar metal with high electrical conductivity and high mechanical strength. As with the other tubes discussed, third cylinder conductor 210 extends from head 122 to barrel end 205 within conductor rod 106. In one example, third cylinder conductor 210 has an outer diameter of about 8 to 9 inches. A third cylinder cavity 212 between second cylinder conductor 206 and third cylinder conductor 210 is an open space, which, if arm 110 were removed from barrel 109 in FIG. 2, would form a tubular cavity extending from head 122 to barrel end 205.

Concentrically around third cylinder conductor 210 and the other tubular conductors, fourth cylinder conductor 214 forms an outer conductive path from head 122 to barrel end 205. Similarly, fourth cylinder conductor 214 is a tubular conductor made of an aluminum alloy or a similar metal with high electrical conductivity and high mechanical strength. In one example, fourth cylinder conductor 214 has an outer diameter of about 14 inches. A gap between an outer diameter of third cylinder conductor 210 and an inner diameter of fourth cylinder conductor 214, in some examples, is about 0.75 inches and is filled with fourth cylinder insulation 216, which is a closed cell polyurethane foam, dielectric, or similar substance.

Radially beyond fourth cylinder conductor 214, a covering or barrel shell 218 encases conductor rod 106. Barrel shell 218 is typically a metal or similar substance providing structural integrity to conductor rod 106. Barrel shell 218 has an inner diameter in excess of an outer diameter of fourth cylinder conductor 214. As a result, a retraction cavity 220 of a tubular shape is formed between fourth cylinder conductor 214 and barrel shell 218 that extends from head 122 to barrel end 205. A stop 222, which is part of a housing for conductor rod 106 at junction 112, defines a longitudinal end for retraction cavity 220 away from head 122. Stop 222 generally aligns radially with barrel end 205 and junction 112.

The various annular or tubular cavities within barrel 109, namely, first cylinder cavity 204, third cylinder cavity 212, and the head end of retraction cavity 220 (barrel shell cavity 242, described below), are sealed or capped by the attachment of head-end interface 120 to their ends at head 122. The attachment of head-end interface 120 is designed to provide an airtight (or hermetic) seal within these cavities, for purposes to be understood further below.

Viewing FIGS. 1 and 2 together, arm 110 is a substantially cylindrical body having a smaller outer diameter than an inner diameter of barrel shell 218 and that mates and slides into barrel 109. As well as providing a longitudinal end for retraction cavity 220, stop 222 also defines an inner diameter through which arm 110 slides, as shown to the left of FIG. 2. By sliding, it is meant that arm 110 may move longitudinally along the Y axis in connection with one or more surfaces within barrel 109 as arm 110 is moved axially with respect to conductor rod 106, from left to right in FIG. 2 for retraction and from right to left in FIG. 2 for extension. The result of the sliding is the increase or decrease in the overall length of conductor rod 106 via arm 110, as illustrated in FIG. 1.

Referring now to the left side of FIG. 2, arm 110 also contains a series of concentric conductors of cylindrical or tubular shape. In this example, from the axial center outward, first piston conductor 224 is positioned at a center of arm 110 and is, as with the other tubular conductors of arm 110, made of a metal such as aluminum 6061-T6 or similar substance having high electrical conductivity and high mechanical strength. First piston conductor 224 extends from tip 124 to an arm end 225, shown at the right side of FIG. 2. Being tubular, first piston conductor 224 has a first piston cavity 226 within its inner diameter that is filled with air or another gas. A second piston conductor 228 concentrically surrounds first piston conductor 224 and extends from tip 124 to arm end 225. Second piston conductor 228 is made of a conductive material, and in some examples has an inner diameter of between about 5 and 6 inches. A space defined as second piston cavity 230 is formed between the inner diameter of second piston conductor 228 and the outer diameter of first piston conductor 224, which is left unfilled other than with air or a similar gas.

Moving radially outward from second piston conductor 228, a third piston conductor 232 axially centered on the Y axis concentrically surrounds second piston conductor 228. Similarly made of a conductive material, third piston conductor 232 is set off radially from second piston conductor 228 a distance of less than 1 inch, which is filled with a third piston insulation 234. As with second cylinder insulation 208 and fourth cylinder insulation 216, third piston insulation 234 can be a closed cell polyurethane foam or comparable substance providing electrical insulation and lightweight stability. Finally, an arm shell 236 of conductive material such as metal concentrically surrounds third piston conductor 232 from tip 124 to about arm end 225. In some examples, arm shell 236 has an outer diameter of about 11.625 inches. Within an inner diameter of arm shell 236, an arm shell cavity 238 of free space exists between arm shell 236 and third piston conductor 232.

In some examples, the outer surface of arm shell 236 includes gasket 240, which serves to stably set apart arm shell 236, and arm 110 generally, from barrel shell 218. As illustrated in FIG. 2, as arm 110 is retracted or extended within barrel 109, gasket 240 separates retraction cavity 220 from a barrel shell cavity 242. As well, gasket 240 can help retain arm 110 within conductor rod 106 in a state of maximum extension by butting against stop 222. Additionally, in a manner discussed below, a radial wall of gasket 240 provides leverage for pneumatic pressure applied within retraction cavity 220 to cause arm 110 to be retracted.

As illustrated, FIG. 2 represents an arrangement in which conductor rod 106 essentially has two longitudinal halves. A first half, barrel 109, on the right side of FIG. 2, includes barrel shell 218 enclosing a series of tubular cylinder conductors aligned along the Y axis. Those cylinder conductors, viewed radially from the center axis, are first cylinder conductor 202, second cylinder conductor 206, third cylinder conductor 210, and fourth cylinder conductor 214. Within that concentric arrangement, tubular regions of open space exist within first cylinder cavity 204 and third cylinder cavity 212. Further, barrel shell 218 encases barrel 109 and forms an open space within retraction cavity 220 and barrel shell cavity 242. On the left side of FIG. 2, arm 110 includes arm shell 236 enclosing a series of tubular piston conductors also aligned along the longitudinal axis of conductor rod 106. Those piston conductors, viewed radially from the center axis, are first piston conductor 224, second piston conductor 228, and third piston conductor 232. Within that concentric arrangement, tubular regions of open space exist within first piston cavity 226 and second piston cavity 230. Further arm shell 236 encases arm 110 and forms an open space within arm shell cavity 238.

In an operating state for conductor rod 106, arm 110 is inserted into barrel 109 to form a nested configuration of the piston conductors and the cylinder conductors. The radial sequence of tubular conductors within barrel 109 are the inverse of, and complementary to, the radial sequence of tubular conductors within arm 110. For example, when arm 110 is inserted into barrel 109, the outer diameter of first piston conductor 224 fits within the inner diameter of first cylinder conductor 202, and the empty space within first cylinder cavity 204 enables first piston conductor 224 to slide forward into barrel 109. During and after the sliding, first piston conductor 224 maintains electrical contact with first cylinder conductor 202, permitting electrical conductivity between those tubular conductors. When first piston conductor 224 is mated within first cylinder conductor 202, first piston cavity 226 and first cylinder cavity 204 extend axially through conductor rod 106 at least from head 122 to tip 124.

Similarly, when the combination of second piston conductor 228, third piston conductor 232, and interposed third piston insulation 234 are slid as part of arm 110 into barrel 109, the outer diameter of third piston conductor 232 fits within the inner diameter of third cylinder conductor 210, and the inner diameter of second piston conductor 228 is slidably engaged with and is inserted over the outer diameter of second cylinder conductor 206. As a result, the sandwich of second piston conductor 228, third piston conductor 232, and third piston insulation 234 slide into the empty space defined by third cylinder cavity 212. In doing so, third piston conductor 232 slides against and electrically contacts third cylinder conductor 210, and second piston conductor 228 slides against and electrically contacts second cylinder conductor 206. In some examples, and as shown similarly in FIG. 2, when conductor rod 106 is fully collapsed, at least some volume of empty space will remain within third cylinder cavity 212, which will have an annular or tubular shape and be defined radially by portions of second cylinder conductor 206 and third cylinder conductor 210.

Conversely, when arm 110 is inserted into barrel 109, the cylinder conductors will slide into cavities within the piston from left to right in FIG. 2, and the cylinder conductors will become nested with the piston conductors. For example, the combination of first cylinder conductor 202, second cylinder conductor 206, and second cylinder insulation 208 will slide into the open space defined by second piston cavity 230 within arm 110, during which, as mentioned, first cylinder conductor 202 electrically contacts first piston conductor 224 and second cylinder conductor 206 electrically contacts second piston conductor 228. Likewise, in the illustrated example, the sandwich of third cylinder conductor 210, fourth cylinder conductor 214, and fourth cylinder insulation 216 will slide into the open space defined by arm shell cavity 238 within arm 110. Third cylinder conductor 210 will then slidingly contact third piston conductor 232, and fourth cylinder conductor 214 will do the same against arm shell 236.

As mentioned above, head-end interface 120 provides at least an electrical connection between conductor rod 106 and work machine 100 for powering electric engine 102 and otherwise enabling operations within work machine 100. Head-end interface 120 also provides the physical securement of first cylinder conductor 202, second cylinder conductor 206, third cylinder conductor 210, and fourth cylinder conductor 214 to work machine 100, allowing arm 110 to extend and retract in relation to conductor rod 106, illustrated in more detail in FIGS. 3 and 4, below.

Figure 3:
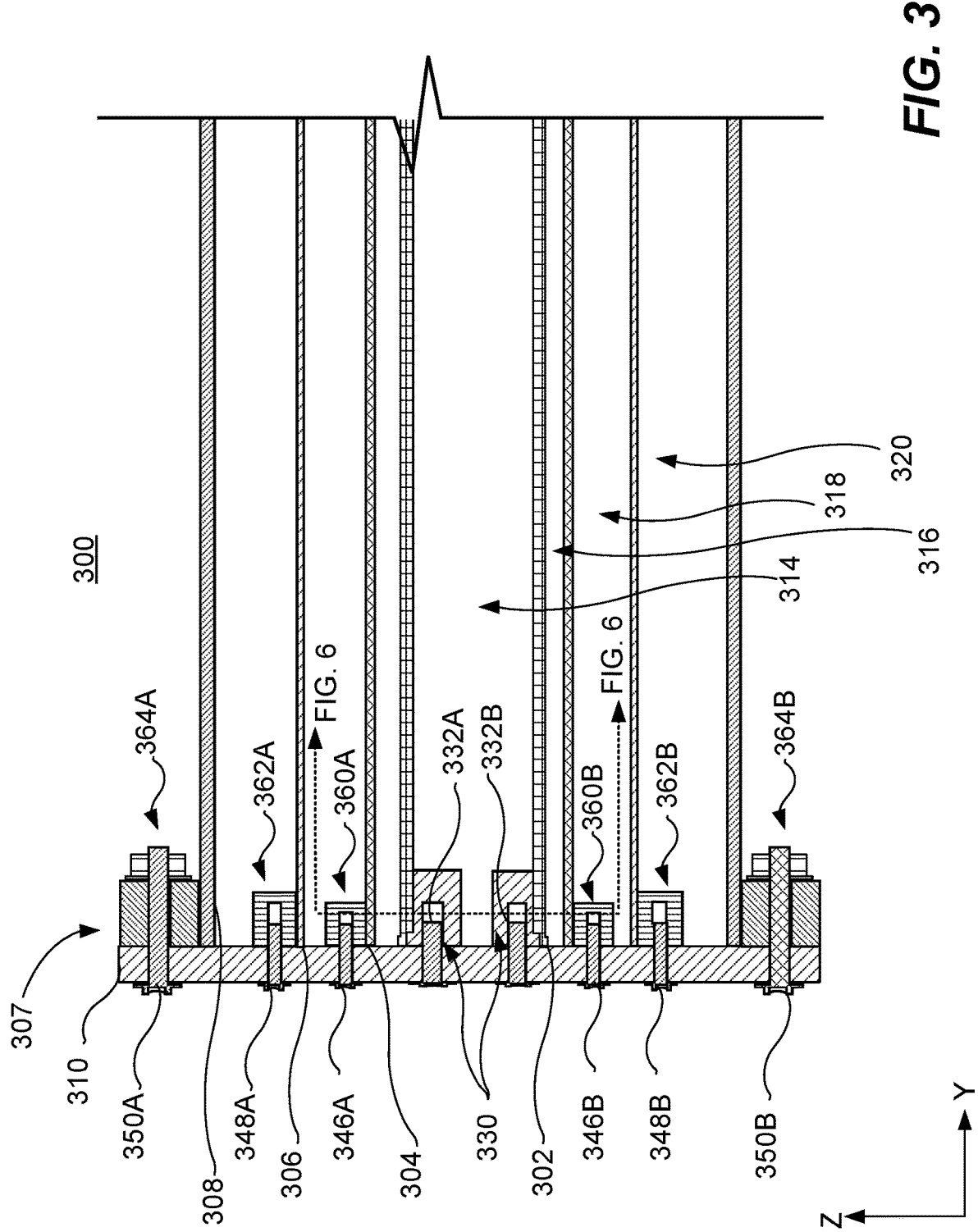
FIG. 3 is a longitudinal cross-sectional view of a conductor rod at a first end proximate to a head-end interface, in accordance with one or more examples of the present disclosure.

FIG. 3 is a longitudinal cross-sectional view of a conductor rod 300 at a first end 307 proximate to head-end interface 310, in accordance with one or more examples of the present disclosure Conductor rod 300 is constructed in a manner similar to conductor rod 106 of FIGS. 1 and 2. However, conductor rod 300 is illustrated as having piston conductors removed for purposes of description. FIG. 3 depicts a longitudinal cross-sectional of a portion of conductor rod 300 when viewed facing in the direction of travel for a work machine, such as work machine 100 of FIG. 1, i.e., in the direction of the X axis. Thus, conductor rod 300 lies in the Y-Z plane, as indicated in FIG. 3. Conductor rod 300 includes first cylinder conductor 302, second cylinder conductor 304, third cylinder conductor 306, and barrel 308. Conductor rod 300 includes connector assembly 312. In a manner similar to the conductor rod 106 of FIG. 1, connector assembly 312 is located proximate to a power supply to conduct power from the power supply to work machine 100 (or load).

First cylinder conductor 302, second cylinder conductor 304, and third cylinder conductor 306 are concentric conductors of tubular shape, i.e. as hollow cylinders. In FIG. 3, from the axial center outward, first cylinder conductor 302 is positioned at a center of barrel 308. Second cylinder conductor 304 concentrically surrounds first cylinder conductor 302. As with first cylinder conductor 302, second cylinder conductor 304 is a tubular conductor made of aluminum or a similar metal with high electrical conductivity and high mechanical strength. Second cylinder conductor 304 is similarly positioned around a Y axis within FIG. 3. Moving farther out radially, third cylinder conductor 306 concentrically surrounds second cylinder conductor 304 and first cylinder conductor 302. Concentrically around third cylinder conductor 306 and the other tubular conductors, barrel 308 forms an outer conductive path. In some examples, barrel 308 can act as a fourth cylinder conductor if constructed from a conductive material. First cylinder conductor 302, second cylinder conductor 304, third cylinder conductor 306, and barrel 308 span a distance from head-end interface 310 to connector assembly 312. Radially beyond fourth cylinder conductor 214, barrel 308 encases conductor rod 300. Barrel 308 is typically a metal or similar substance providing structural integrity to conductor rod 300. However, in some examples, barrel 308 is a non-conductive material that isolations the electrically energized interior of conductor rod 300 from an environment. Barrel 308 has an inner diameter in excess of an outer diameter of third cylinder conductor 306.

As tubes, first cylinder conductor 302 defines first cylinder cavity 314 within its inner surface, second cylinder conductor 304 defines second cylinder cavity 316 between its inner surface and the outer surface of the first cylinder conductor 302, third cylinder conductor 306 defines third cylinder cavity 318 between its inner surface and the outer surface of the second cylinder conductor 304, barrel 308 defines fourth cylinder cavity 320 between its inner surface and the outer surface of the third cylinder conductor 306. First cylinder cavity 314, second cylinder cavity 316, third cylinder cavity 318, and/or fourth cylinder cavity 320 can be filled with insulative materials such as closed cell polyurethane foam. In other examples, first cylinder cavity 314, second cylinder cavity 316, third cylinder cavity 318, and/or fourth cylinder cavity 320 are filled with a dielectric. Dielectric materials can be solids, liquids, or gases. Some solids can be used as dielectrics, such as porcelain, glass, plastics, and the closed cell polyurethane foam described above. In configurations in which a cylinder conductor is hermetically sealed on both ends of conductor rod 300, fluidic dielectrics can be used in cavities, First cylinder cavity 314, second cylinder cavity 316, third cylinder cavity .318, and/or fourth cylinder cavity 320. Fluid dielectrics can include some forms of oil or gaseous dielectrics such as air, nitrogen, helium, and other dry gases such as sulfur hexafluoride. In further configurations in which a cylinder conductor or piston conductor is hermetically sealed on both ends of the cylinder conductor or piston conductor, a partial vacuum can be used. In various examples, a partial vacuum can be used as a nearly lossless dielectric even though its relative dielectric constant is unity. It should be noted that the dielectrics disclosed herein are merely examples, as other dielectrics may be used and are considered to be within the scope of the presently disclosed subject matter.

Different dielectrics can be used in various cylinder cavities of conductor rod 300 to allow for different voltages and different types of potentials to be conducted by conductor rod 300. For example, first cylinder conductor 302 and second cylinder conductor 304 can be configured to conduct a DC voltage and third cylinder conductor 306 can be configured to conduct an AC voltage. Because both first cylinder conductor 302 and second cylinder conductor 304 are conducting DC voltage, there may be no need or requirement to have a dielectric other than air between first cylinder conductor 302 and second cylinder conductor 304. However, if the AC voltage being carried on third cylinder conductor 306 is of a certain voltage level or frequency, a dielectric of suitable strength can be used to prevent a short between second cylinder conductor 304 and third cylinder conductor 306.

The various annular or tubular cavities within barrel 308, namely, first cylinder cavity 314, second cylinder cavity 316, third cylinder cavity .318, and/or fourth cylinder cavity 320, are sealed or capped by the attachment of the ends of the cylinder conductors to an interface. In FIG. 3, the interface is connector assembly 312, though the same technology and techniques can be used to attach the other ends of cylinder conductors to another interfaces, such as head-end interface 120 of FIG. 2. The attachment is designed to provide an airtight (or hermetic) seal within these cavities. For example, when using fluidic insulative materials or dielectrics, or a partial vacuum, a hermetic seal maintains the fluid within the particular cavity to which the fluid is inserted, or, maintains the partial vacuum from which the air was pumped out. To provide for an airtight seal, the ends of the cylinder conductors can be affixed to interfaces using various technologies, including welding, glue, adhesive, gaskets, and the like. To removably affix the ends of the cylinder conductors, whereby the ends can be installed, removed, and reinstalled, the cylinder conductors can use a terminal connector assembly. The terminal connector assemblies use a threaded member inserted into a terminal receiver. The terminal receiver is affixed to a respective cylinder conductor, thereby providing for affixing and removing the cylinder conductors from either a head-end interface, such as head-end interface of FIGS. 1 and 2, or connector assembly 312.

Conductor rod 300 of FIG. 3 is illustrated as using different types of terminal connector assemblies. In FIG. 3, first cylinder conductor 302 is affixed to connector assembly 312 using terminal connector assembly 330 and threaded members 332A and 332B. Threaded members 332A and 332B are inserted through connector assembly 312 and into terminal connector assembly 330. At head-end interface 310, first cylinder conductor 302 is affixed to head-end interface 310 using terminal connector assembly 334 and threaded members 336A and 336B. Threaded members 336A and 336B are inserted through head-end interface 310 and into terminal connector assembly 334. Terminal connector assemblies 330 and 334 are affixed to first cylinder conductor 302 using various technologies such as, but not limited to, welding, soldering, and the like.

Terminal connector assemblies 330 and 334 are ring-type connector assemblies, explained in more detail in FIGS. 4 and 5, below. However, some examples of the presently disclosed subject matter us cuboid-type terminal connector assemblies rather than using ring. Second cylinder conductor 304, third cylinder conductor 306, and barrel 308 are affixed to connector assembly 312 using cuboid connectors. More specifically, second cylinder conductor 304 is affixed to connector assembly 312 using cuboid connectors 360A and 360B. Third cylinder conductor 306 is affixed to connector assembly 312 using cuboid connectors 362A and 362B. Barrel 308 is affixed to connector assembly 312 using cuboid connectors 364A and 364B. As with terminal connector assembly 330, the cuboid connectors use threaded members to affix their respective cuboid connectors to connector assembly 312, and thus, affixing their respective cylinder conductor to connector assembly 312. Threaded members 346A and 346B securely affix cuboid connectors 360A and 360B, respectively, to connector assembly 312. Threaded members 348A and 348B securely affix cuboid connectors 362A and 362B, respectively, to connector assembly 312. Threaded members 350A and 350B securely affix cuboid connectors 364A and 364B, respectively, to connector assembly 312. Further details of an example ring-type terminal connector assembly are provided in FIGS. 4 and 5, below, and further details of an example cuboid-type terminal connector assembly are provided in FIG. 6, below.

Figure 4:
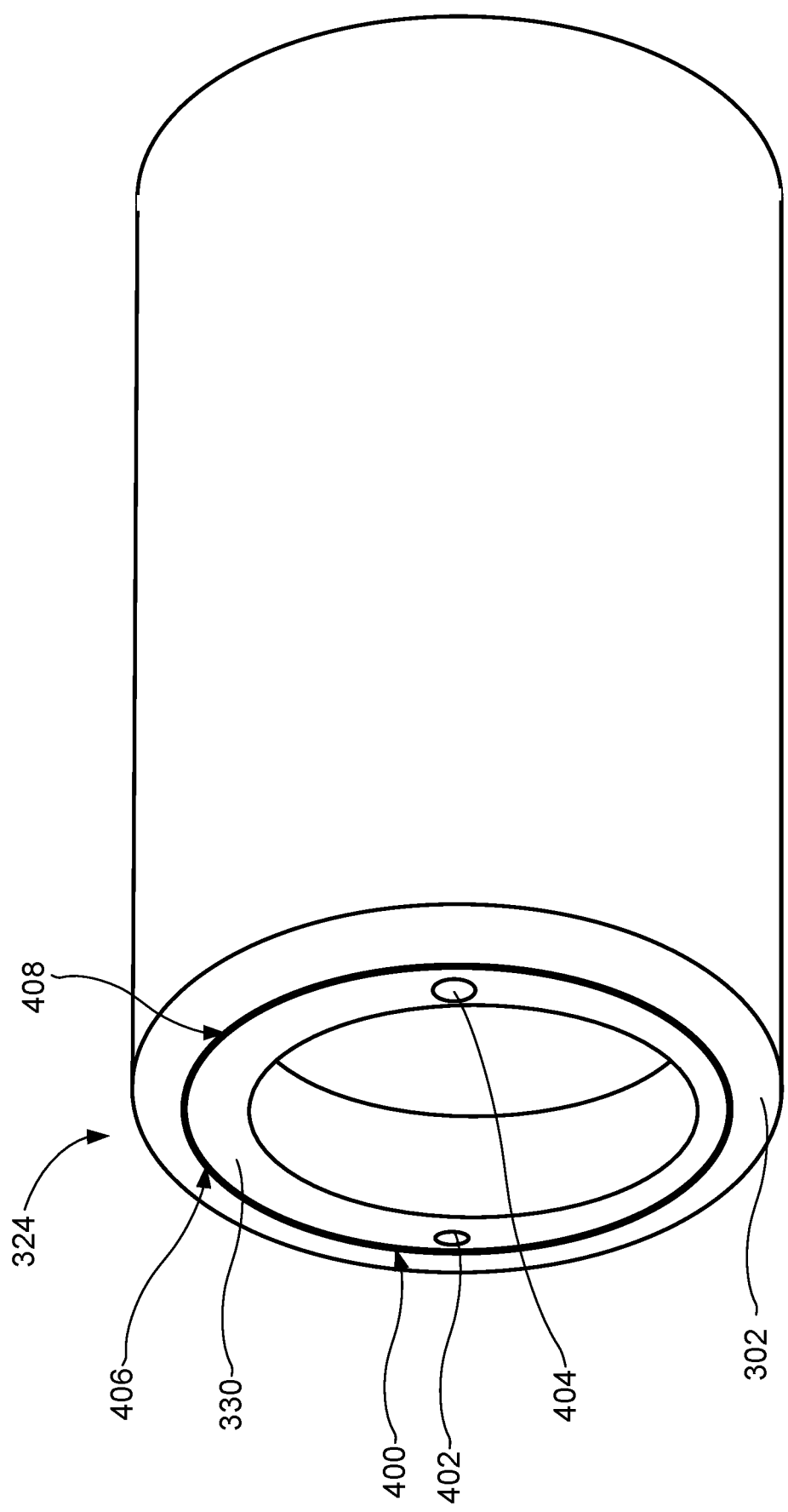
FIG. 4 is an isometric view of a cylinder conductor illustrating a ring-type terminal connector assembly, in accordance with one or more examples of the present disclosure.

FIG. 4 is an isometric view of first cylinder conductor 302 illustrating ring-type terminal connector assembly 330, in accordance with one or more examples of the present disclosure. Ring-type terminal connector assemblies use a cylindrical ring to which a cylinder conductor is affixed. First cylinder conductor 302 has disposed within an inner diameter of first cylinder conductor 302 a terminal connector assembly 330. Terminal connector assembly 330 is a tubular shape that has an outer diameter, when measured radially from the center of first cylinder conductor 302, that allows an inner surface of first cylinder conductor 302 to abut and be affixed to terminal connector assembly 330 at interface 400. Terminal connector assembly 330 includes receiving locations 402 and 404. Receiving locations 402 and 404 are locations in terminal connector assembly 330 into which threaded members 332A and 332B are inserted and threaded to secure first cylinder conductor 302 and terminal connector assembly 330 to connector assembly 312. It should be noted that because terminal connector assembly 330 is tubular in shape, first cylinder conductor 302 may be removably affixed against connector assembly 312 without mechanical affixment to terminal connector assembly 330. For example, terminal connector assembly 330 may be removably affixed to connector assembly 312 and then first cylinder conductor 302 is inserted onto and around terminal connector assembly 330, whereby an inner surface 406 of first cylinder conductor 302 is inserted over an outer surface 408 of terminal connector assembly 330 at interface 400. While this may not mechanically affix first cylinder conductor 302 to connector assembly 312 in the same manner as if first cylinder conductor 302 was welded to terminal connector assembly 330, when first cylinder conductor 302 is placed over terminal connector assembly 330, terminal connector assembly 330 positionally secures first cylinder conductor 302. First cylinder conductor 302 may be affixed to a particular location on connector assembly 312 using not only the secured position of terminal connector assembly 330 on connector assembly 312, but also by the use of shaped surfaces, illustrated in more detail in FIG. 5, below.

Figure 5:
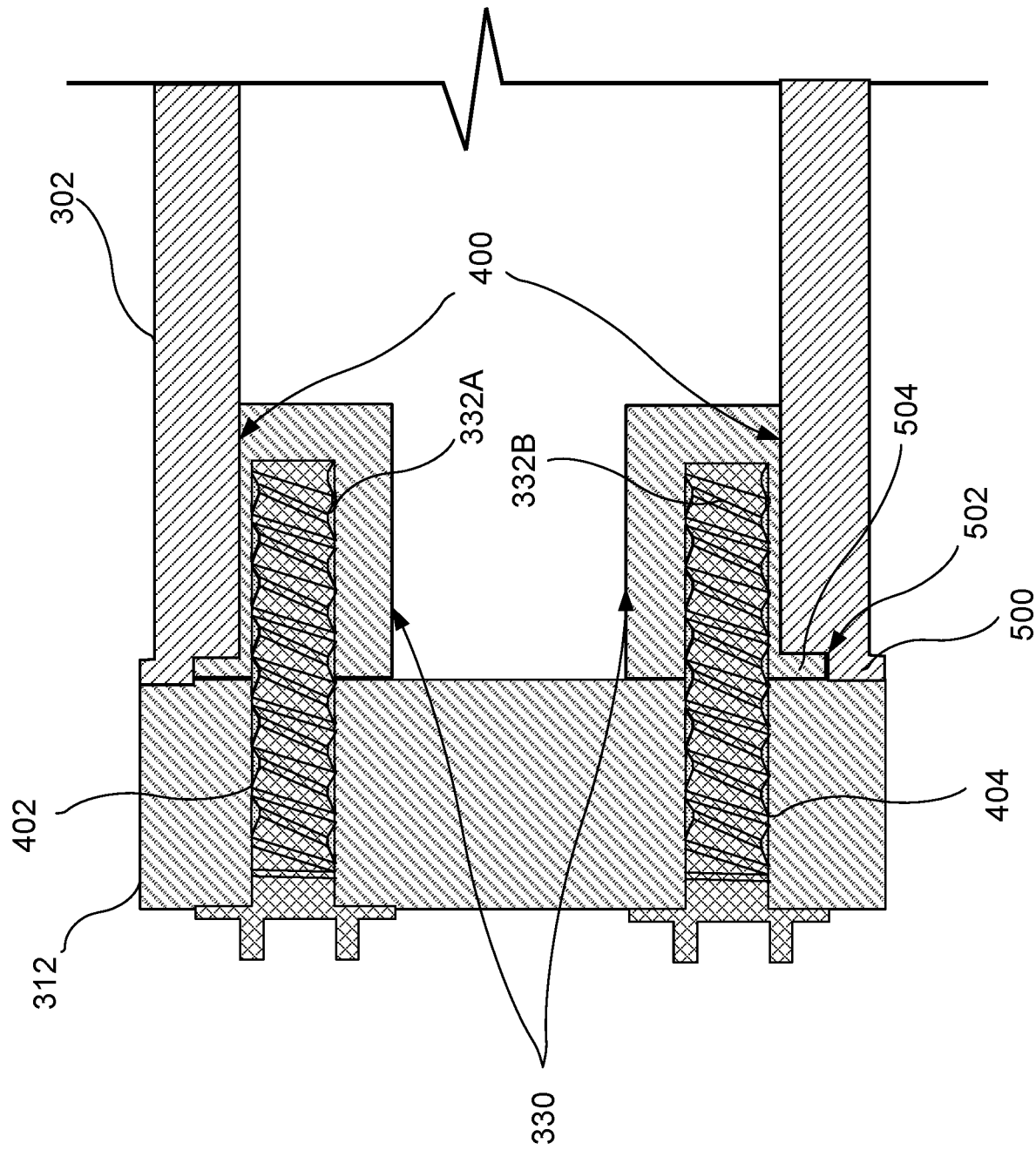
FIG. 5 is a cross-sectional view showing the portion of a cylinder conductor affixed to connector assembly, in accordance with one or more examples of the present disclosure.

FIG. 5 is a cross-sectional view showing the portion of first cylinder conductor 302 affixed to connector assembly 312, in accordance with one or more examples of the present disclosure. As illustrated in FIG. 5, first cylinder conductor 302 is affixed to connector assembly 312 by terminal connector assembly 330. In FIG. 5, first cylinder conductor 302 is engaged onto terminal connector assembly 330 at interface 400. As noted above, first cylinder conductor 302 can be engaged onto terminal connector assembly 330 at interface 400 by affixing first cylinder conductor 302 to terminal connector assembly 330 using welding, soldering, or other similar technique. In another example, first cylinder conductor 302 can be engaged onto terminal connector assembly 330 at interface 400 by slidable engaging first cylinder conductor 302 onto terminal connector assembly 330 at interface 400. The presently disclosed subject matter is not limited to any particular technology for affixing, either permanently or temporarily, first cylinder conductor 302 onto terminal connector assembly 330. Also illustrated in FIG. 5 are threaded members 332A and 332B. Threaded members 332A and 332B are inserted through connector assembly 312 thru receiving locations 402 and 404, respectively, and into terminal connector assembly 330.

As noted above in FIG. 4, first cylinder conductor 302 and terminal connector assembly 330 may be shaped or formed to provide additional securement capabilities. This means that and end of first cylinder conductor 302 and terminal connector assembly 330 may not be perfectly cylindrical, but rather, may be shaped in a manner to provide additional mechanical benefits. In FIG. 5, first cylinder conductor 302 includes flange 500 and receiving slot 502. Terminal connector assembly 330 includes flange 504. In some examples, the flange 504 is sized and shaped to fit securely within receiving slot 502. Flange 500 can be sized and shaped to provide an increased surface area onto which first cylinder conductor 302 is secured to the surface of connector assembly 312. In a similar manner, flange 504 can be sized and shaped to provide an increased surface area onto which terminal connector assembly 330 is secured to the surface of connector assembly 312. The additional surface area provided by flange 500 and flange 504 can provide for hermetically sealing first cylinder conductor 302 to connector assembly 312.

FIGS. 4 and 5 illustrate one technology for securing a cylinder conductor to connector assembly 312 or head-end interface 310. Terminal connector assembly 330 uses a ring structure over which and onto first cylinder conductor 302 is inserted. However, other technologies may be used. The cylinder conductors can be permanently affixed to their respective cuboid connectors using welding, soldering, or other similar technology. In other examples, the cylinder conductors can be placed against their respective cuboid connectors whereby the cuboid connector provides a physical barrier to movement of the cylinder conductor. In either technology, the cuboid connector is sized and shaped to abut to an outer surface of their respective cylinder conductor, illustrated in more detail in FIG. 6.

Figure 6:
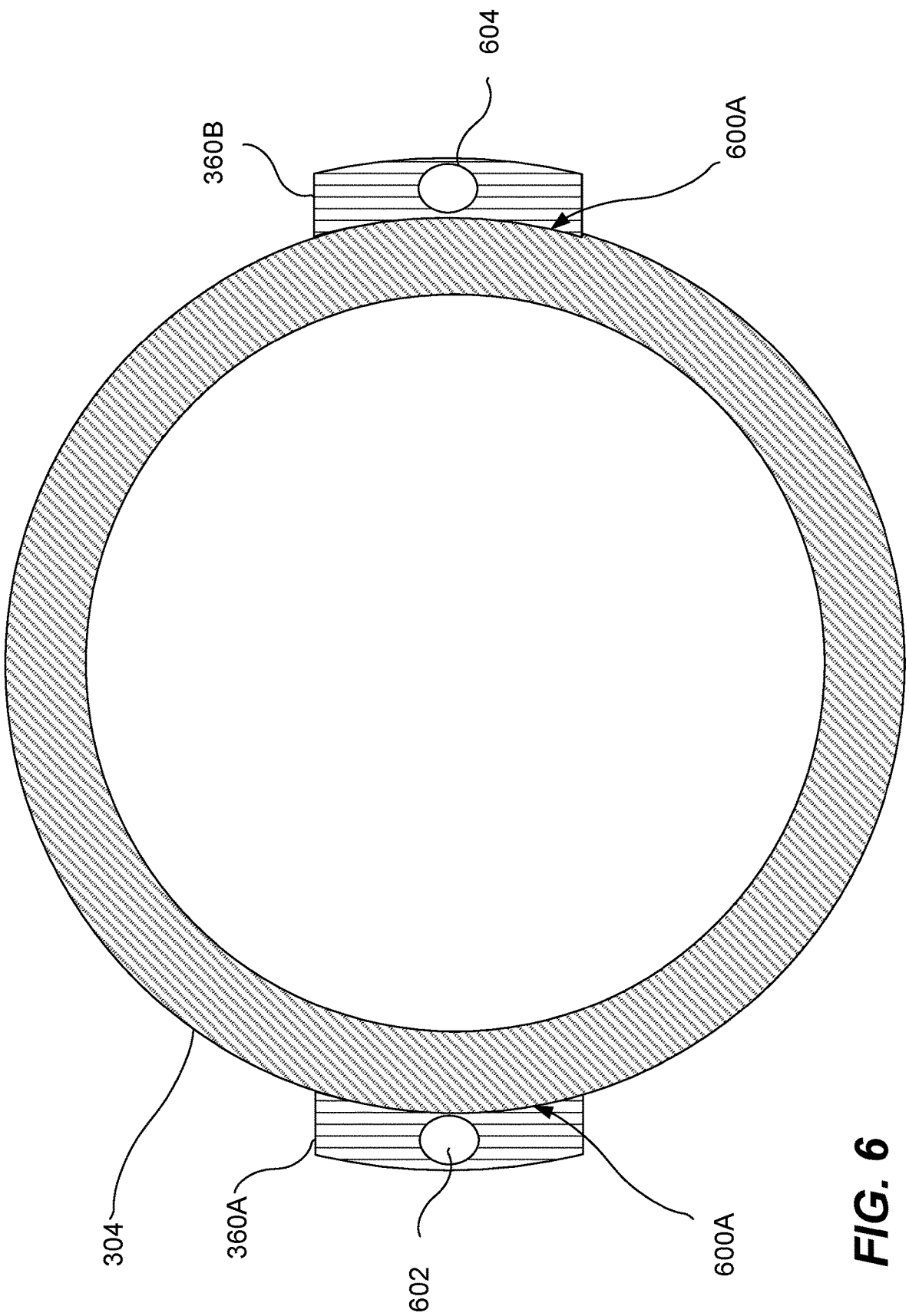
FIG. 6 is a cross-sectional view of a cylinder conductor and cuboid connectors along the cut lines illustrated in FIG. 3, in accordance with one or more examples of the present disclosure.

FIG. 6 is a cross-sectional view of second cylinder conductor 304 and cuboid connectors 360A and 360B along the cut lines illustrated in FIG. 3 but with first cylinder conductor 302 and terminal connector assembly 330 removed for purposes of simplicity, in accordance with one or more examples of the present disclosure. As shown in FIG. 6, cuboid connectors 360A and 360B abut to an outer surface of second cylinder conductor 304 at interfaces 600A and 600B. As noted above, second cylinder conductor 304 can be engaged with cuboid connectors 360A and 360B at interfaces 600A and 600B by affixing second cylinder conductor 304 to cuboid connectors 360A and 360B at interfaces 600A and 600B, respectively, using welding, soldering, or other similar techniques. In another example, second cylinder conductor 304 can be engaged into cuboid connectors 360A and 360B at interfaces 600A and 600B by slidably engaging second cylinder conductor 304 into the inner surfaces of cuboid connectors 360A and 360B at interfaces 600A and 600B. The presently disclosed subject matter is not limited to any particular technology for affixing, either permanently or temporarily, second cylinder conductor 304 onto cuboid connectors 360A and 360B. Also illustrated in FIG. 6 are receiving locations 602 and 604, into which threaded members 346A and 346B are inserted.

Figure 7:
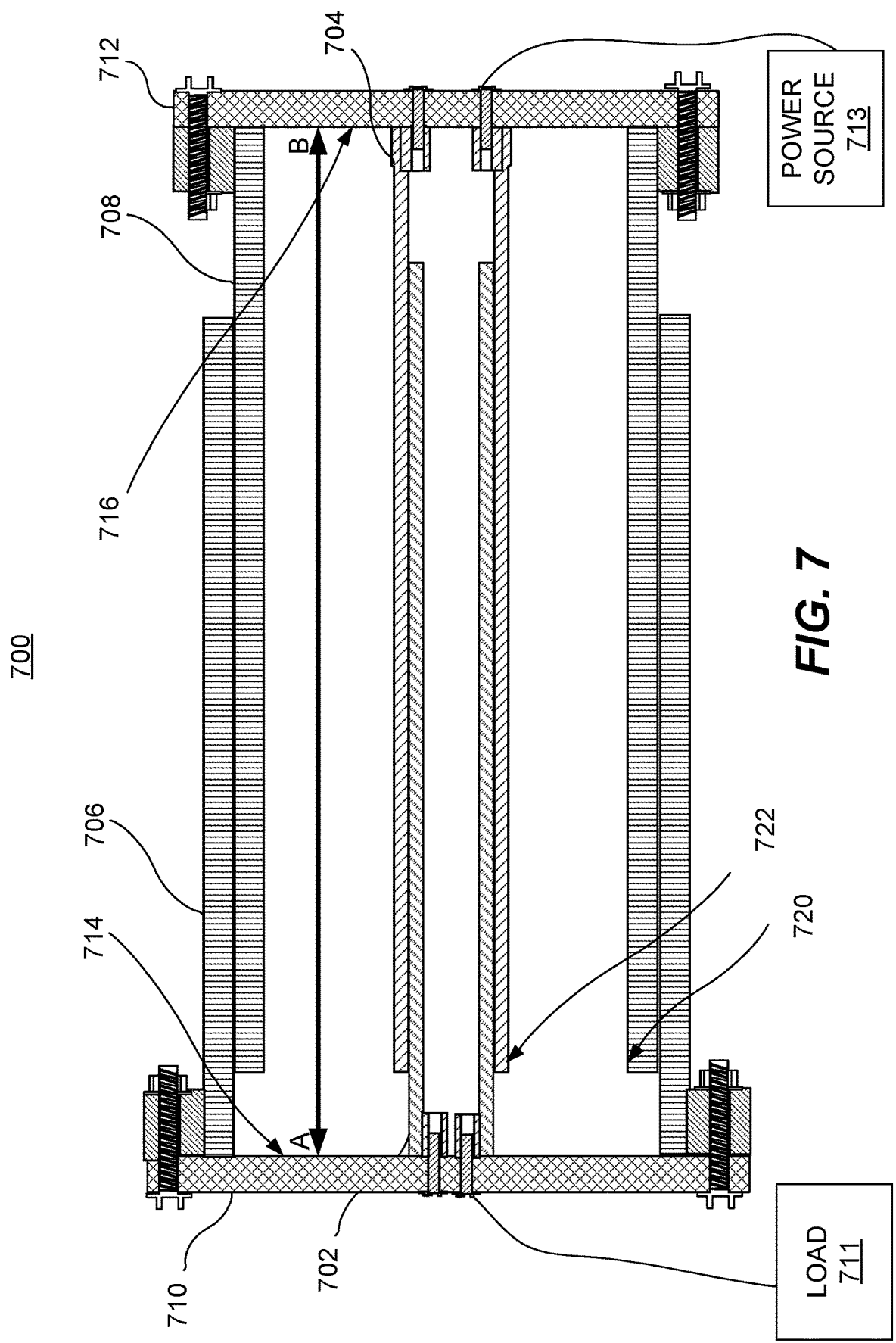
FIG. 7 illustrates a longitudinal section of a conductor rod in an extended position, in accordance with one or more examples of the present disclosure.
Figure 8:
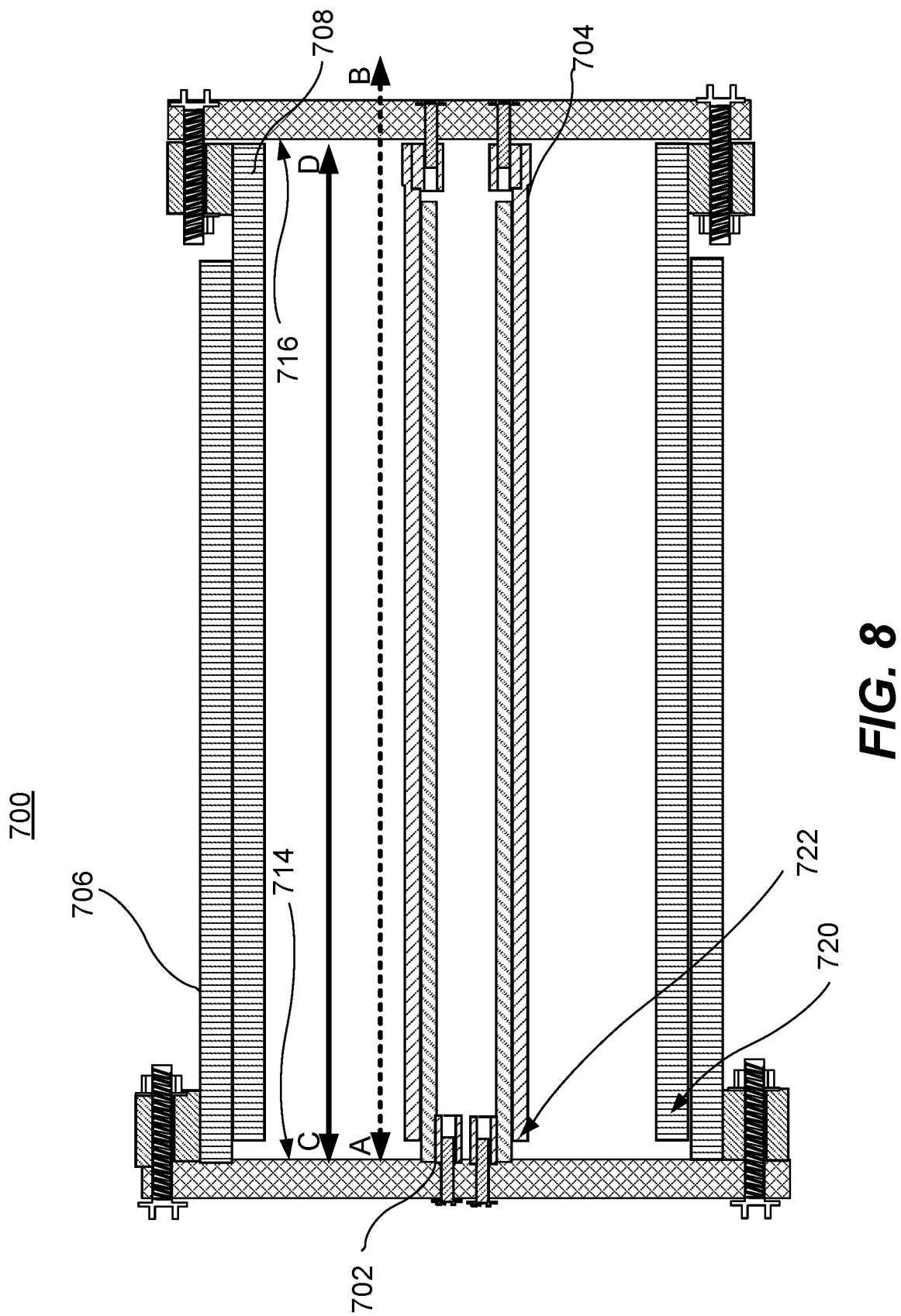
FIG. 8 illustrates a longitudinal section of conductor rod in a retracted position, in accordance with one or more examples of the present disclosure.

As described above, a conductor rod according to various examples described herein can extend and retract to accommodate a moving or changing distance between a load and a source of electrical power. In the example illustrated in FIG. 1, as work machine 100 travels along a path, the distance between work machine 100 and power rail 108 may change. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101. FIGS. 7 and 8 are illustrations showing the sliding, or extending/retracting, nature of a conductor rod.

FIGS. 7 and 8 illustrates a longitudinal section of a conductor rod 700 in an extended and retracted position, with FIG. 7 showing an extended position and FIG. 8 showing a retracted position, in accordance with one or more examples of the present disclosure. For the purposes of simplification, one cylinder conductor (e.g., cylinder conductor 702), and one piston conductor (e.g., piston conductor 704) are illustrated. Also illustrated are barrel 706 and arm 708. In FIG. 7, head-end interface 710 is mechanically and electrically affixed to a load 711, such as work machine 100 of FIG. 1. Barrel 706 is affixed to head-end interface 710 and arm 708 is affixed to connector assembly 712. Connector assembly 712 is connected to a power source 713. Power source 713 provides electrical power through connector assembly 712, piston conductor 704, cylinder conductor 702, and through head-end interface 710 to load 711. As illustrated in FIG. 7, a surface 714 of head-end interface 710 interior to conductor rod 700 is separated from a surface 716 of connector assembly 412 interior to conductor rod 700 by a distance defined by line AB. In FIG. 8, conductor rod 700 has been retracted from the length illustrated by line AB to the length illustrated by line CD. Line AB of FIG. 7 is shown in FIG. 8 for the purposes of comparison. In FIG. 8, in the retracted position, a distal end 720 of arm 708 and a distal end 722 of piston conductor 704 nearly abuts surface 714 of head-end interface 710, whereas in FIG. 7, distal end 720 of arm 708 and distal end 722 of piston conductor 704 in FIG. 8 a greater distance from surface 714 of head-end interface 710. This is illustrated by showing the distance defined by line AB being greater than the distance defined by line CD.

As a conductor rod, such as the conductor rod 700 of FIGS. 7 and 8, extends and retracts, the physical and electrical interface between a cylinder conductor and its respective piston conductor is maintained. This is done to maintain electrical continuity between a load and a power source regardless of the extended or retracted length of conductor rod 700. Examples of physical and electrical interfaces that may be used are illustrated in more detail in FIG. 9, below.

Figure 9:
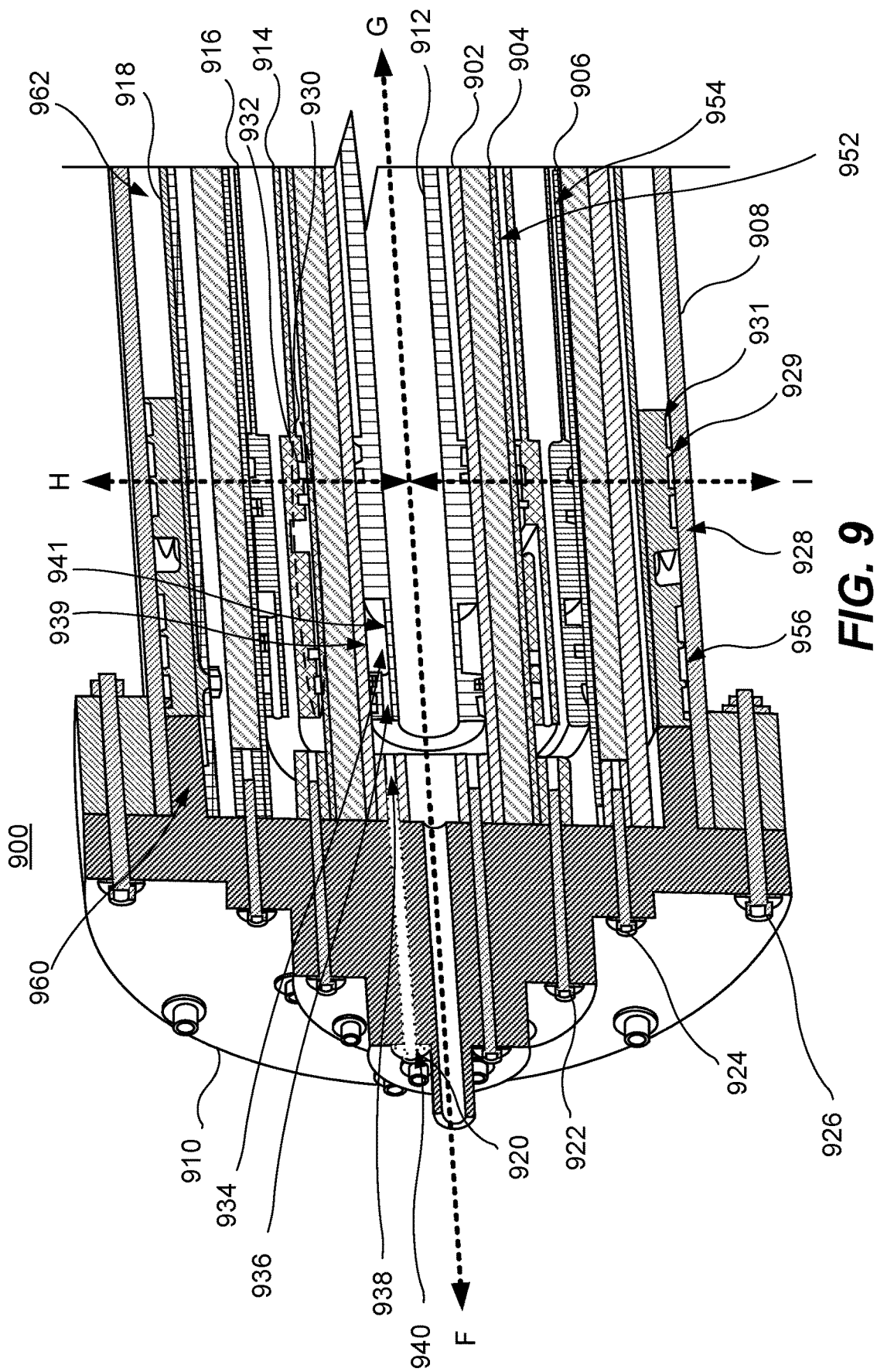
FIG. 9 is a longitudinal isometric view of a cross-section of a conductor rod showing conductor-to-conductor interfaces, in accordance with one or more examples of the present disclosure.

FIG. 9 illustrates a longitudinal isometric view of a cross-section of a conductor rod 900 showing conductor-to-conductor interfaces, in accordance with one or more examples of the present disclosure. Conductor rod 900 is constructed in a manner to conductor rod 106 of FIGS. 1 and 2. Conductor rod 900 includes first cylinder conductor 902, second cylinder conductor 904, third cylinder conductor 906, and barrel 908. First cylinder conductor 902, second cylinder conductor 904, third cylinder conductor 906, and barrel 908 are mechanically affixed to head-end interface 910. Conductor rod 900 further includes first piston conductor 912, second piston conductor 914, third piston conductor 916, and arm 918. First cylinder conductor 902 concentrically surrounds first piston conductor 912 from radius HI along axial length FG. Second piston conductor 914 concentrically surrounds second cylinder conductor 904 from radius HI along axial length FG. Third cylinder conductor 906 concentrically surrounds third piston conductor 916 from radius HI along axial length FG. Barrel 908 concentrically surrounds arm 918 from radius HI along axial length FG. First piston conductor 912, second piston conductor 914, third piston conductor 916, and arm 918 are insertable into and retractable from first cylinder conductor 902, second cylinder conductor 904, third cylinder conductor 906, and barrel 908 in a manner similar to the conductor rod 700 of FIGS. 7 and 8. First cylinder conductor 902 is mechanically affixed to head-end interface 910 by various terminal connectors, such as terminal connector 920, by way of example. Second cylinder conductor 904 is mechanically affixed to head-end interface 910 by various terminal connectors, such as terminal connector 922, by way of example. Third cylinder conductor 906 is mechanically affixed to head-end interface 910 by various terminal connectors, such as terminal connector 924, by way of example. Barrel 908 is mechanically affixed to head-end interface 910 by various terminal connectors, such as terminal connector 926, by way of example.

Piston conductors 912-916 and arm 918 are in electrical and physical communication with their respective cylinder conductors 902-906 and barrel 908 via one or more conducting interfaces. For example, a conducting interface 928 comprises a contacting interface between an exterior contacting surface 929 of arm 918 and an interior contacting surface 931 of barrel 908. Conducting interface 928 provides both a slidable physical interface as well as an electrical interface between barrel 908 and arm 918. Acting as an electrical interface, electrical power is transferred from piston conductors 912-916 to their respective cylinder conductors 902-906, allowing for the continuous transfer of electrical power while the conductor rod 900 extends and retracts. Various technologies may be used to provide for a physical and electrical interface. The arm 918 extends and retracts by sliding along the conducting interface 928, maintaining a physical and electrical interface.

Another example of a conducting interface is conducting interface 930. Rather than direct contact between a cylinder conductor and a piston conductor acting as an electrical and physical interface, conducting interface 930 uses carbon brushes, such as brush 932. Brush 932 is a brush formed from a conductive material, such as carbon or graphite, that provides both a physical and electrical interface between second cylinder conductor 904 and second piston conductor 914. Brush 932 may be formed by compacting a mix of materials such as carbon, graphite, and metallic power (e.g. copper) into a solid piece of material sized and shaped to be used in conducting interface 930.

Another example of an electrical interface material that provides for the conduction of electrical power from a piston conductor to a cylinder conductor is a metallic alloy that is liquid at a certain temperature, such as room temperature. An example of a metallic alloys is GALINSTAN. GALINSTAN is a eutectic alloy composed of gallium, indium, and tin which melts at −19C (−2 F) and is thus liquid at room temperature. It should be noted, however, that other metal allows with properties similar to GALINSTAN may be used and are considered to be within the scope of the presently disclosed subject matter.

In order to keep a metallic alloy at an interface, the metallic alloy will be contained within a space enclosed by the surfaces of the piston conductor and the cylinder conductor in which the liquid alloy is being used. For example, conducting interface 934 is a space defined by an interior surface 939 of first cylinder conductor 902 and an exterior surface 941 of first piston conductor 912. Conducting interface 934 is configured to act as a fluidic barrier, reducing or eliminating potential leaks of the liquid metallic alloy contained therein into other areas of the conductor rod 900. As first piston conductor 912 extends and retracts within first cylinder conductor 902, conducting interface 934 with a liquid metallic alloy contained therein provide for a constant electrical connection between first cylinder conductor 902 and first piston conductor 912.

During use, the conducting interface 934 may be filled with additional liquid metallic alloy. FIG. 9 illustrates one manner in which this may be accomplished, though other technologies for filling or refilling conducting interface 934 with additional liquid metallic alloy may be used and are considered to be within the scope of the presently disclosed subject matter. In FIG. 9, to introduce a liquid metallic alloy into conducting interface 934, piston channel 936, and interface channel 938 are used. To introduce a liquid metallic alloy into conducting interface 934, conductor rod 900 is retracted so that first piston conductor 912 abuts or nearly abuts interface channel 938 so that interface channel 938 is in liquid communication with piston channel 936. Terminal connector 920 is removed, providing for interface channel 938 to extend from an outer surface of head-end interface 910 to piston channel 936. The liquid metallic alloy can be introduced at input 940, through interface channel 938, through piston channel 936, and into conducting interface 934.

An example process to assemble or manufacture conductor rod 900 of FIG. 9 commences with assembling a barrel section 960. Barrel section 960 includes a barrel and any other cylinder conductor affixed to a head-end interface. Conductor rod 900 further includes an arm section 962. Arm section 962 includes an arm and any other piston conductor affixed to a terminal connector. As described above, an arm section 962 is designed to slide into and out of a barrel section 960. Barrel section 960 is formed by affixing first cylinder conductor 902, second cylinder conductor 904, third cylinder conductor 906, and barrel 908 to head-end interface 910 using the terminal connectors. As described above, first cylinder conductor 902 is mechanically affixed to head-end interface 910 by various terminal connectors, such as terminal connector 920, by way of example. Second cylinder conductor 904 is mechanically affixed to head-end interface 910 by various terminal connectors, such as terminal connector 922, by way of example. Third cylinder conductor 906 is mechanically affixed to head-end interface 910 by various terminal connectors, such as terminal connector 924, by way of example. Barrel 908 is mechanically affixed to head-end interface 910 by various terminal connectors, such as terminal connector 926, by way of example. Once first cylinder conductor 902, second cylinder conductor 904, third cylinder conductor 906, and barrel 908 are affixed to head-end interface 910, the assembly of the barrel end is complete. To assemble arm section 962, first piston conductor 912, second piston conductor 914, third piston conductor 916, and arm 918 are affixed to a conductor assembly, such as connector assembly 114 of FIG. 1. Once first piston conductor 912, second piston conductor 914, third piston conductor 916, and arm 918 are affixed to a conductor assembly, the arm end assembly is complete. Arm section 962 is thereafter inserted into barrel section 960, whereby first piston conductor 912 is inserted into first cylinder conductor 902, second piston conductor 914 is inserted over an outer surface 952 of second cylinder conductor 904, third piston conductor 916 is inserted into an interior surface 954 of third cylinder conductor, and arm 918 is inserted into an interior surface 956 of barrel 908. In some examples, the assembly process continues by affixing the barrel 109 to the work machine 100. In an operating state for conductor rod 900, arm section 962 is inserted into barrel section 960 to form a nested configuration of the piston conductors and the cylinder conductors. The radial sequence of tubular conductors within barrel section 960 are the inverse of, and complementary to, the radial sequence of piston or tubular conductors within arm section 962. For example, when arm section 962 is inserted into barrel section 960, the outer diameter of first piston conductor 912 fits within the inner diameter of first cylinder conductor 902, second piston conductor 914 fits onto an outer diameter of second cylinder conductor 904, and an inner diameter of third piston conductor 916 fits within an inner diameter of third cylinder conductor 906.

As noted above, various configurations of a conductor rod, such as the conductor rod 900 of FIG. 9, provide for the extension and retraction of the conductor rod 900 to suit dynamic distance changes between a load, such as work machine 100 of FIG. 1, and a source of power, such as power rail 108 of FIG. 1. As the load moves transversely in relation to the power source, there may be lengths of the conductor rod that are not suitable for maintaining an electrical and physical connection between the load and the power source. For example, if work machine 100 of FIG. 1 moves too close to power rail 108, it may be desirable to have conductor rod 106 disengage trailing arms 116 and contactor 118 from power rail 108 to, among other reasons, prevent damage to either work machine 100 or power rail 108. In another example, if work machine 100 moves too far away from power rail 108, it may be desirable to have conductor rod 106 disengage trailing arms 116 and contactor 118 from power rail 108. Thus, in some examples, it may be desirable to use a retaining pin and retaining groove to cause a rotational motion of a conductor rod, whereby when rotated, the conductor rod is disengaged from a power rail, illustrated in more detail in FIGS. 10-12, below.

Figure 10:
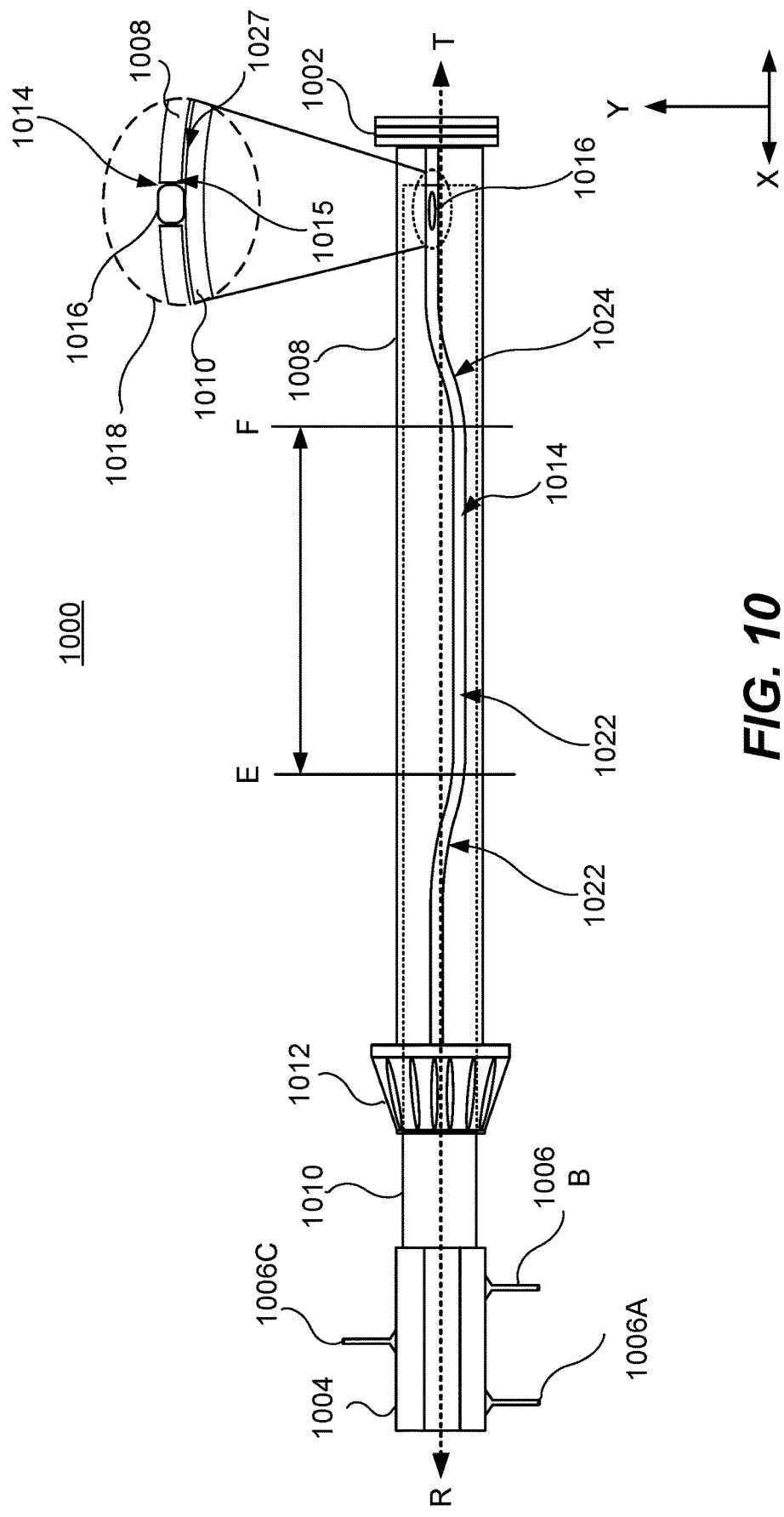
FIG. 10 illustrates a longitudinal section of a conductor rod that is rotatable, in accordance with one or more examples of the present disclosure.

FIG. 10 illustrates a longitudinal section of a conductor rod 1000 that is rotatable, in accordance with various examples described herein. Conductor rod 1000 is shown without a barrel, such as barrel 109 of FIG. 1, or arm, such as arm 110 of FIG. 1, solely for purposes of illustration and not by way of limitation. Conductor rod 1000 includes head-end interface 1002 used to mechanically and electrically connect conductor rod 1000 to a load, such as work machine 100 of FIG. 1. Conductor rod 1000 further includes connector assembly 1004. Connector assembly 1004 provides an interface to a power rail, such as power rail 108 of FIG. 1, though trailing arms and a contactor, such as trailing arms 116 and contactor 118 of FIG. 1. Connector assembly 1004 includes power connectors, such as power connector 1006, that electrically and physical connect connector assembly 1004 to trailing arms 116.

Conductor rod 1000 has cylinder conductor 1008 mechanically connected to head-end interface 1002 and junction 1012. Piston conductor 1010 is mechanically connected to connector assembly 1004 through junction 1012. Cylinder conductor 1008 and piston conductor 1010 are cylindrical in nature, each having an inner diameter and outer diameter, the sizes of which depend on the particular configuration. As noted above, conductor rod 1000 is shown without a barrel or arm, which would enclose cylinder conductor 1008 and piston conductor 1010. Piston conductor 1010 is slidable within junction 1012 and an interior space of cylinder conductor 1008 in a manner similar to the piston conductor/cylinder conductor arrangements described hereinabove.

To provide for a rotation of connector assembly 1004 about central axis RT extending longitudinally through the center of conductor rod 1000 based on the position of piston conductor 1010 within cylinder conductor 1008, cylinder conductor 1008 includes retaining groove 1014. Retaining groove 1014 is a channel formed through surface 1015 of cylinder conductor 1008. The retaining groove 1014 extends a length of cylinder conductor 1008. Piston conductor 1010 includes retaining pin 1016 mechanically affixed to an outer surface 1027 of piston conductor 1010 and sized to fit and be slidable within retaining groove 1014, illustrated in more detail in inset 1018. Inset 1018 is a close-up, cross-sectional illustration viewed from head-end interface 1002 towards junction 1012. Shown in inset 1018 is piston conductor 1010 and retaining pin 1016. Retaining pin 1016 is mechanically affixed to outer surface 1027 of piston conductor 1010. Retaining pin 1016 is disposed within retaining groove 1014 formed within cylinder conductor 1008. As piston conductor 1010 extends and retracts within cylinder conductor 1008, retaining pin 1016 slides within retaining groove 1014.

Returning to FIG. 10, retaining groove 1014 includes disengaging sections 1022 and 1024 and engaged section 1026. Engaged section 1026 is illustrated as being the area of retaining groove 1014 between length EF, whereas disengaging sections 1022 and 1024 are illustrated as being the areas outside of length EF. Disengaging sections 1022 and 1024 are defined by curves that modify the retaining groove 1014 from one position, such as engaged section 1026, to disengaging sections 1022 and 1024. As noted above, as a load, such as work machine 100 of FIG. 1, moves transversely in relation to a power source, there may be lengths of conductor rod 1000 that are not suitable for maintaining an electrical and physical connection between the load and the power source. The use of disengaging sections 1022 and 1024 and engaged section 1026 provide for the rotation of connector assembly 1004. As piston conductor 1010 extends and retracts, retaining groove 1014 sets the rotational position of piston conductor 1010 caused by the position of retaining pin 1016 in retaining groove 1014. Because piston conductor 1010 is mechanically connected to connector assembly 1004, a rotation of piston conductor 1010 will cause a rotation of connector assembly 1004. Thus, connector assembly 1004 will have a first orientation when retaining pin 1016 is in retaining groove 1014 while in engaged section 1026. Further, connector assembly 1004 will have a second orientation different from the first orientation (disengaged) when retaining pin 1016 is in retaining groove 1014 outside of engaged section 1026, such as disengaging sections 1022 and 1022, shown in more detail in FIGS. 11 and 12, below.

Figure 11:
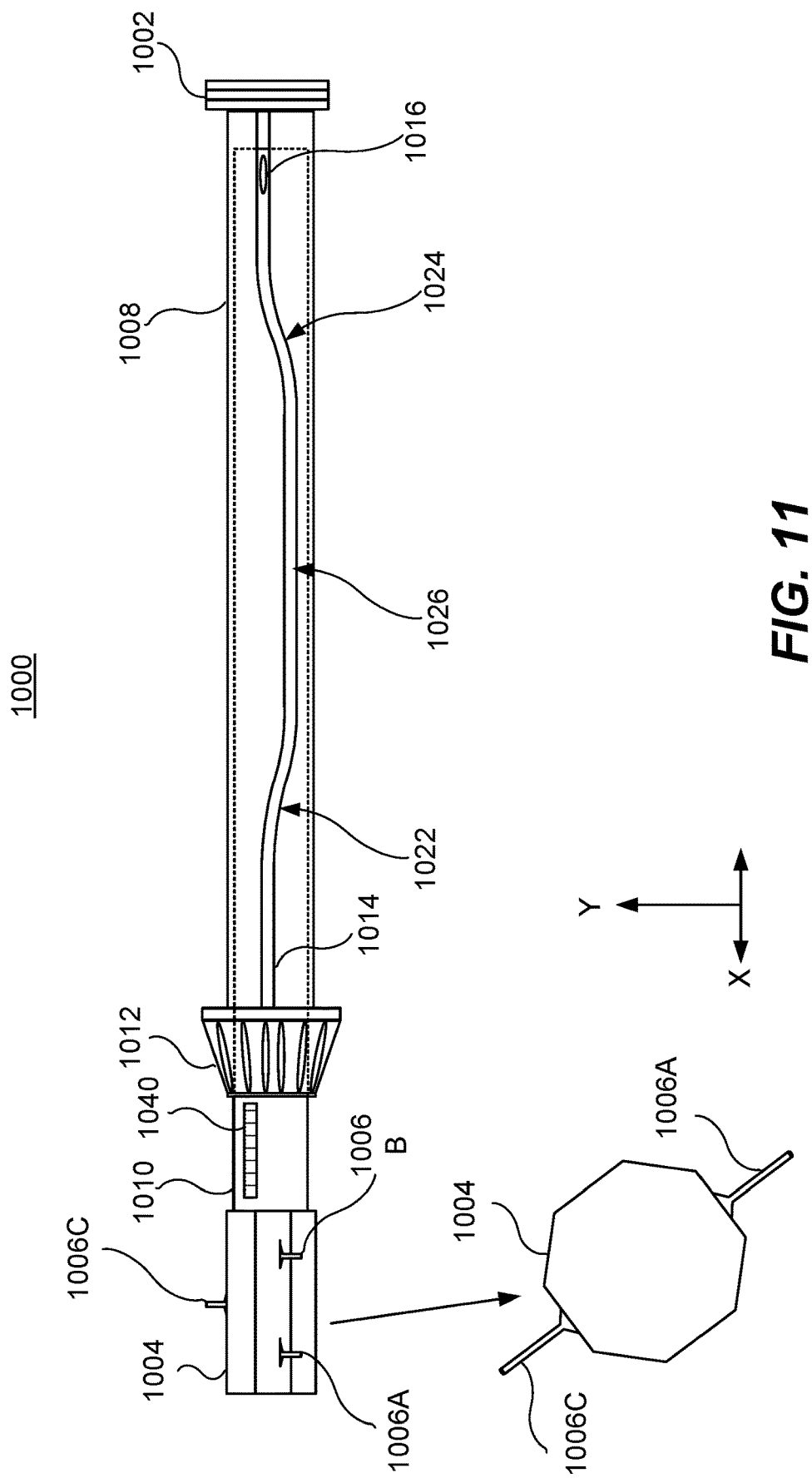
FIG. 11 illustrates conductor a rod in a disengaged orientation, in accordance with one or more examples of the present disclosure.

FIG. 11 illustrates conductor rod 1000 in a disengaged orientation, in accordance with one or more examples of the present disclosure. In the disengaged orientation, illustrated by demarcation 1040 on the exterior of piston conductor 1010, connector assembly 1004 is in a rotational configuration whereby power connectors, such as power connector 1006, are rotationally positioned away from a horizontal position defined by axis X. It should be noted that a disengaged orientation means that connector assembly 1004 has rotated to a degree such that trailing arms and contactor attached to connector assembly 1004, such as trailing arms 116 and contactor 118 of FIG. 1, are disengaged (physically or electrically disengaged) from a power rail. It should be noted that the disengaged orientation may be an electrical disengagement, a physical disengagement, or both. In FIG. 11, piston conductor 1010 is inserted within cylinder conductor 1008 so that retaining pin 1016 is positioned within retaining groove 1014 in disengaging section 1024. It should be noted that demarcation 1040 on piston conductor 1010 is merely used to illustrate the rotation of piston conductor 1010.

Figure 12:
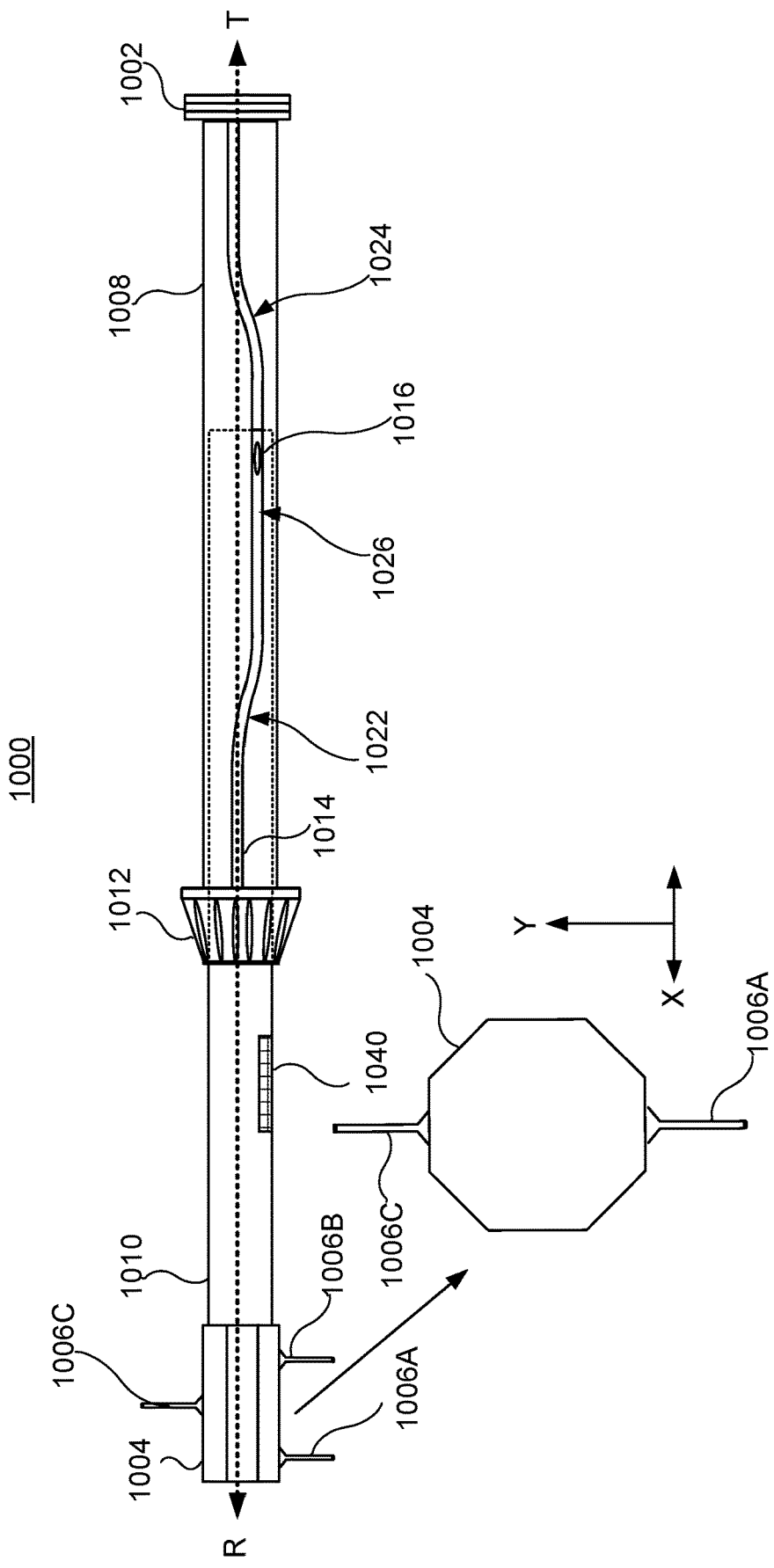
FIG. 12 illustrates conductor a rod in an engaged orientation, in accordance with one or more examples of the present disclosure.

FIG. 12 illustrates conductor rod 1000 in an engaged orientation, in accordance with one or more examples of the presently disclosed subject matter. As illustrated in FIG. 12, piston conductor 1010 extracted from cylinder conductor 1008 at a greater distance than illustrated in FIG. 11. The extraction of piston conductor 1010 from an interior of cylinder conductor 1008 causes retaining pin 1016 to move from disengaged section 1024 of retaining groove 1014 and into engaged section 1026 of retaining groove 1014. The movement of retaining pin 1016 through retaining groove 1014 into engaged section 1026 causes piston conductor 1010 to rotate about central axis RT extending the length of conductor rod 1000, illustrated by the movement of demarcation 1040 from the position in FIG. 11 to the position illustrated in FIG. 12.

In the engaged orientation of FIG. 12 whereby retaining pin 1016 is in engaged section 1026 of retaining groove 1014, connector assembly 1004 is in a rotational configuration. In a rotational configuration, power connectors, such as power connector 1006, are rotationally positioned towards a horizontal position defined by axis X. It should be noted, however, that an engaged orientation is not limited to a horizontal orientation. As noted above in FIG. 10, an engaged orientation provides for connector assembly 1004 to be rotated to a degree such that trailing arms and contactor attached to connector assembly 1004, such as trailing arms 116 and contactor 118 of FIG. 1, are engaged (physically or electrically disengaged) to a power rail. It should be noted that the engaged orientation may be an electrical engagement, a physical engagement, or both.

INDUSTRIAL APPLICABILITY

The present disclosure provides a work machine powered electrically by an extendable and retractable conductor rod. The conductor rod has a barrel with an extendable arm axially moveable within the barrel. Both the barrel and the arm have tubular-shaped concentric conductors that slide against each other as the arm moves axially and maintain electrical conductivity for the electrical power from the power rails to the work machine. An axial passageway of open space passes through the centermost tubular-shaped conductors. Voids between selected conductors in the barrel and in the arm are filled with insulation so that a radial interface between the arm and the barrel is substantially solid, but for the axial passageway.

As noted above, an example work machine that is electrically powered generally includes an electric engine and a conductor rod 106. The conductor rod 106 extends from head 122 proximate to the work machine 100 to a tip 124 spaced laterally from work machine 100. A barrel 109 extending from head 122 toward tip 124 has cylinder tubes concentrically positioned around the central passageway and cylinder cavities between the cylinder tubes. An arm 110 extending from tip 124 toward head 122 has piston tubes concentrically positioned around the central passageway and piston cavities, where the cylinder tubes are radially offset from the piston tubes and arm 110 is slidably mated with barrel 109. Cylinder conductors are maintained in both physical and electrical communication with their respective piston conductors using an electrical interface. As a result of the configurations described herein, electrical power may be maintained between a load and power source over various lengths between the load and the power source. For example, conductor rod 106 is extendable and retractable as work machine 100 moves closer to, or further away, from an electrical power source, thus maintaining the delivery of electrical power to work machine 100.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A conductor rod, comprising:
   an arm section extending along a longitudinal axis of the conductor rod, the arm section comprising:
   a first piston conductor affixed to a connector assembly at a first end of the conductor rod, the first piston conductor extending along the longitudinal axis having a first inner diameter and a first outer diameter;
   a second piston conductor affixed to the connector assembly at the first end, the second piston conductor extending along the longitudinal axis having a second inner diameter greater than the first outer diameter and a second outer diameter; and
   an arm affixed to the connector assembly at the first end, the arm extending along the longitudinal axis having a third inner diameter greater than the second outer diameter and a third outer diameter; and
   a barrel section extending the longitudinal axis of the conductor rod, the barrel section comprising:
   a first cylinder conductor affixed to a head-end interface at a second end of the conductor rod, the first cylinder conductor extending along the longitudinal axis having a fourth outer diameter and a fourth inner, wherein the fourth inner diameter is greater than the first outer diameter of the first piston conductor, wherein a first inner surface of the first cylinder conductor is slidably engaged to a first outer surface of the first piston conductor at a first conducting interface;
   a second cylinder conductor affixed to the head-end interface at the second end, the second cylinder conductor extending along the longitudinal axis having a fifth outer diameter less than the second inner diameter of the second piston conductor and greater than the fourth outer diameter of the first cylinder conductor, wherein a second outer surface of the second cylinder conductor is slidably engaged to a second inner surface of the second piston conductor at a second conducting interface; and
   a barrel affixed to the head-end interface at the second end, the barrel extending along the longitudinal axis having a sixth inner diameter greater than the third outer diameter of the arm, wherein a third inner surface of the barrel is slidably engaged to a third outer surface of the second piston conductor.

2. The conductor rod of claim 1, wherein the first cylinder conductor, the second cylinder conductor, the first piston conductor, or the second piston conductor are comprised of graphite, copper, aluminum, gold, silver, nickel, zinc, or alloys thereof.

3. The conductor rod of claim 1, wherein the first conducting interface maintains a first electrical connection between the first cylinder conductor and the first piston conductor as the arm section is moved into and out of the barrel section, and wherein the second conducting interface maintains a second electrical connection between the second cylinder conductor and the second piston conductor as the arm section is moved into and out of the barrel section.

4. The conductor rod of claim 1, wherein the conducting interface comprises a carbon brush, a graphite brush, or a liquid metallic alloy.

5. The conductor rod of claim 4, wherein the liquid metallic alloy comprises GALINSTAN.

6. The conductor rod of claim 1, wherein head-end interface provides a first electrical connection from the connector assembly through the first piston conductor and the first cylinder conductor, and wherein the head-end interface provides a second electrical connection from the connector assembly through the second piston conductor and the second cylinder conductor.

7. The conductor rod of claim 1, wherein the head-end interface comprises:
  a first plurality of terminal connectors disposed through the head-end interface, wherein the first plurality of terminal connectors mechanically affix the first cylinder conductor to the head-end interface;
  a second plurality of terminal connectors disposed through the head-end interface, wherein the second plurality of terminal connectors mechanically affix the second cylinder conductor to the head-end interface; and
  a third plurality of terminal connectors disposed through the head-end interface, wherein the third plurality of terminal connectors mechanically affix the barrel to the head-end interface.

8. The conductor rod of claim 1, wherein the connector assembly comprises:
  a fourth plurality of terminal connectors disposed through the connector assembly, wherein the fourth plurality of terminal connectors mechanically affix the first piston conductor to the connector assembly;
  a fifth plurality of terminal connectors disposed through the connector assembly, wherein the fifth plurality of terminal connectors mechanically affix the second piston conductor to the connector assembly; and
  a sixth plurality of terminal connectors disposed through the terminal connector, wherein the sixth plurality of terminal connectors mechanically affix the arm to the connector assembly.

9. The conductor rod of claim 8, wherein the fourth plurality of terminal connectors receive a first potential of electrical energy from a power rail through connector assembly and the fifth plurality of terminal connectors receive a second potential of electrical energy from the power rail through the connector assembly.

10. A work machine, comprising:
  an electric engine;
  a conductor rod for providing electrical energy to the electric engine from a power source, the conductor rod extending a longitudinal axis from a first end proximate the work machine to a second end spaced laterally from the work machine, the conductor rod comprising:
    an arm section inserted into a barrel section, the arm section comprising:
      a first piston conductor affixed to a connector assembly at the second end, the first piston conductor extending along the longitudinal axis having a first inner diameter and a first outer diameter;
      a second piston conductor affixed to the connector assembly, the second piston conductor extending along the longitudinal axis having a second inner diameter greater than the first outer diameter and a second outer diameter; and
      an arm affixed to the connector assembly, the arm extending along the longitudinal axis having a third inner diameter greater than the second outer diameter and a third outer diameter; and
    the barrel section, comprising:
      a first cylinder conductor affixed to a head-end interface at the first end, the first cylinder conductor extending along the longitudinal axis having a fourth outer diameter and a fourth inner, wherein the fourth inner diameter is greater than the first outer diameter of the first piston conductor, wherein a first inner surface of the first cylinder conductor is slidably engaged to a first outer surface of the first piston conductor at a first conducting interface;
      a second cylinder conductor affixed to the head-end interface at the first end, the second cylinder conductor extending along the longitudinal axis having a fifth outer diameter less than the second inner diameter of the second piston conductor and greater than the fourth outer diameter of the first cylinder conductor, wherein a second outer surface of the second cylinder conductor is slidably engaged to a second inner surface of the second piston conductor at a second conducting interface; and
      a barrel affixed to the head-end interface, the barrel extending along the longitudinal axis having a sixth inner diameter greater than the third outer diameter of the arm, wherein a third inner surface of the barrel is slidably engaged to a third outer surface of the second piston conductor.

11. The work machine of claim 10, wherein the first cylinder conductor, the second cylinder conductor, the first piston conductor, or the second piston conductor are comprised of graphite, copper, aluminum, gold, silver, nickel, zinc, or alloys thereof.

12. The work machine of claim 10, wherein the first conducting interface maintains a first electrical connection between the first cylinder conductor and the first piston conductor as the arm section is moved into and out of the barrel section, and wherein the second conducting interface maintains a second electrical connection between the second cylinder conductor and the second piston conductor as the arm section is moved into and out of the barrel section.

13. The work machine of claim 10, wherein the first conducting interface or the second conducting interface comprises a carbon brush or a graphite brush.

14. The work machine of claim 10, wherein the first conducting interface or the second conducting interface comprises a liquid metallic alloy.

15. The work machine of claim 14, wherein the liquid metallic alloy comprises GALINSTAN.

16. The work machine of claim 10, further comprising a first cylinder cavity defined by a first space between an exterior surface of the second piston conductor and an inner surface of the arm, wherein the first cylinder cavity is filled with a dielectric.

17. The work machine of claim 16, wherein the dielectric comprises an oil, air, nitrogen, helium, sulfur hexafluoride, or partial vacuum.

18. A method of assembling a conductor rod, the method comprising:
   forming a barrel section by:
      affixing a first cylinder conductor to a head-end interface using a first terminal connector,
      affixing a second cylinder conductor to the head-end interface using a second terminal connector,
      affixing a third cylinder conductor to the head-end interface using a third terminal connector, and
      affixing a barrel to the head-end interface using a fourth terminal connector;
   forming an arm section by:
      affixing a first piston conductor to a conductor assembly using a fifth terminal connector,
      affixing a second piston conductor to the conductor assembly using a sixth terminal connector,
      affixing a third piston conductor to the conductor assembly using a seventh terminal connector, and
      affixing an arm to the conductor assembly using an eighth terminal connector; and
   inserting the arm section into the barrel section, whereby:
      the first piston conductor is inserted into an interior space of the first cylinder conductor,
      the second piston conductor is inserted into a first cylinder cavity defined by an interior surface of the second cylinder conductor and an exterior surface of the first piston conductor,
      the third piston conductor is inserted into a second cylinder cavity defined by an interior surface of the third cylinder conductor and an exterior surface of second piston conductor, and
      the arm is inserted into a third cylinder cavity defined by an interior surface of the barrel and an exterior surface of the third piston conductor.

19. The method of claim 18, further comprising affixing the barrel section to a work machine.

20. The method of claim 19, further comprising electrically connecting the head-end interface to the work machine and the conductor assembly to a power supply.

\* \* \* \* \*